United States Patent
Terefe

(10) Patent No.: US 12,411,247 B2
(45) Date of Patent: Sep. 9, 2025

(54) LIDAR SENSOR DENOISING FOR ADVERSE CONDITIONS AND/OR NONSALIENT OBJECTS

(71) Applicant: Zoox, Inc., Foster City, CA (US)

(72) Inventor: Nehemia Girma Terefe, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 86 days.

(21) Appl. No.: 18/240,933

(22) Filed: Aug. 31, 2023

(65) Prior Publication Data
US 2025/0076509 A1    Mar. 6, 2025

(51) Int. Cl.
| | |
|---|---|
| *G01S 17/931* | (2020.01) |
| *B60W 50/02* | (2012.01) |
| *B60W 50/029* | (2012.01) |
| *G01S 7/48* | (2006.01) |
| *G01S 17/89* | (2020.01) |

(52) U.S. Cl.
CPC ....... *G01S 17/931* (2020.01); *B60W 50/0205* (2013.01); *B60W 50/029* (2013.01); *G01S 7/4802* (2013.01); *G01S 17/89* (2013.01); *B60W 2050/0215* (2013.01); *B60W 2420/408* (2024.01)

(58) Field of Classification Search
CPC ...... G01S 17/931; G01S 7/4802; G01S 17/89; G01S 17/87; B60W 50/0205; B60W 50/029; B60W 2050/0215; B60W 2420/408
See application file for complete search history.

(56) References Cited

U.S. PATENT DOCUMENTS

| | | | |
|---|---|---|---|
| 10,488,507 B2 | 11/2019 | Adachi et al. | |
| 11,195,282 B2 | 12/2021 | Wang et al. | |
| 12,099,123 B2 * | 9/2024 | Geng | G01S 7/4802 |
| 2020/0309923 A1 * | 10/2020 | Bhaskaran | G01S 17/87 |
| 2020/0309957 A1 * | 10/2020 | Bhaskaran | G01S 17/86 |

FOREIGN PATENT DOCUMENTS

| | | |
|---|---|---|
| JP | 2017166966 A | 9/2017 |
| KR | 102405818 B1 | 6/2022 |
| KR | 102420585 B1 | 7/2022 |
| KR | 20220099473 A | 7/2022 |

OTHER PUBLICATIONS

Search Report and Written Opinion for International Application No. PCT/US24/43168, Dated Dec. 4, 2024, 12 pages.

* cited by examiner

*Primary Examiner* — Thomas Ingram
(74) *Attorney, Agent, or Firm* — Lee & Hayes, P.C.

(57) ABSTRACT

Particulate matter, such as fog, snow, rain, steam, vehicle exhaust, debris (plastic bags), etc. may cause one or more sensor types to generate false positive solid surface detections. In particular, various depth measurements may be impeded by particulate matter. Identifying false positive return(s) may comprise clustering lidar points, determining differences in range indicated by two different lidar devices having lidar points in the cluster, determining first differences that are more negative than a negative difference threshold and second differences that are more positive than a positive difference threshold, determining a first portion of lidar data in the cluster associated with the first differences and the second differences is associated with particulate matter or debris, and controlling a vehicle based at least in part on suppressing the first portion of the lidar data or indicating that the first portion of the lidar data is associated with particulate matter or debris.

20 Claims, 10 Drawing Sheets

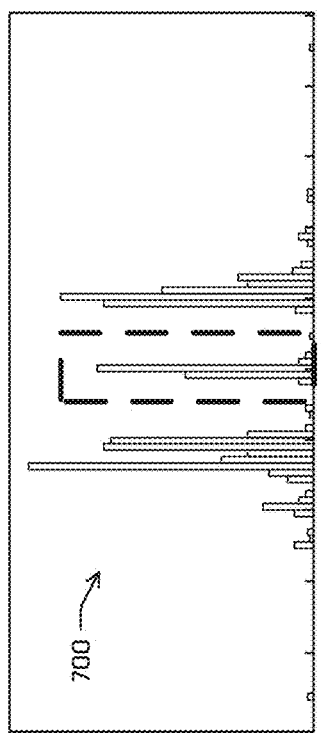
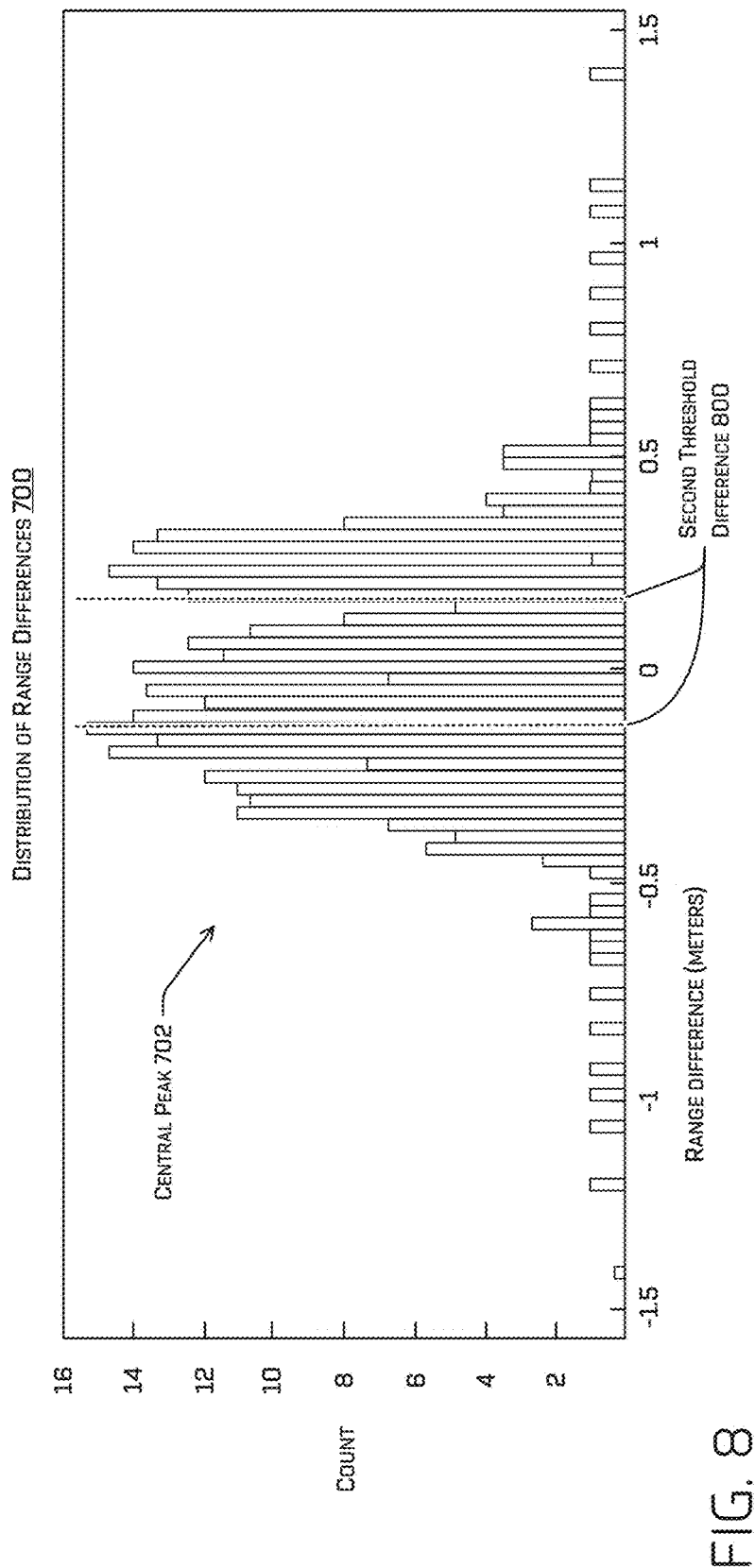
FIG. 8

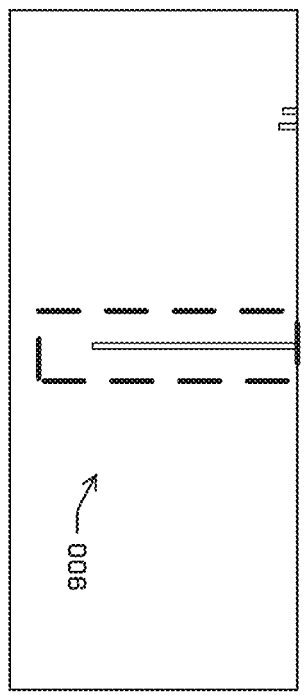
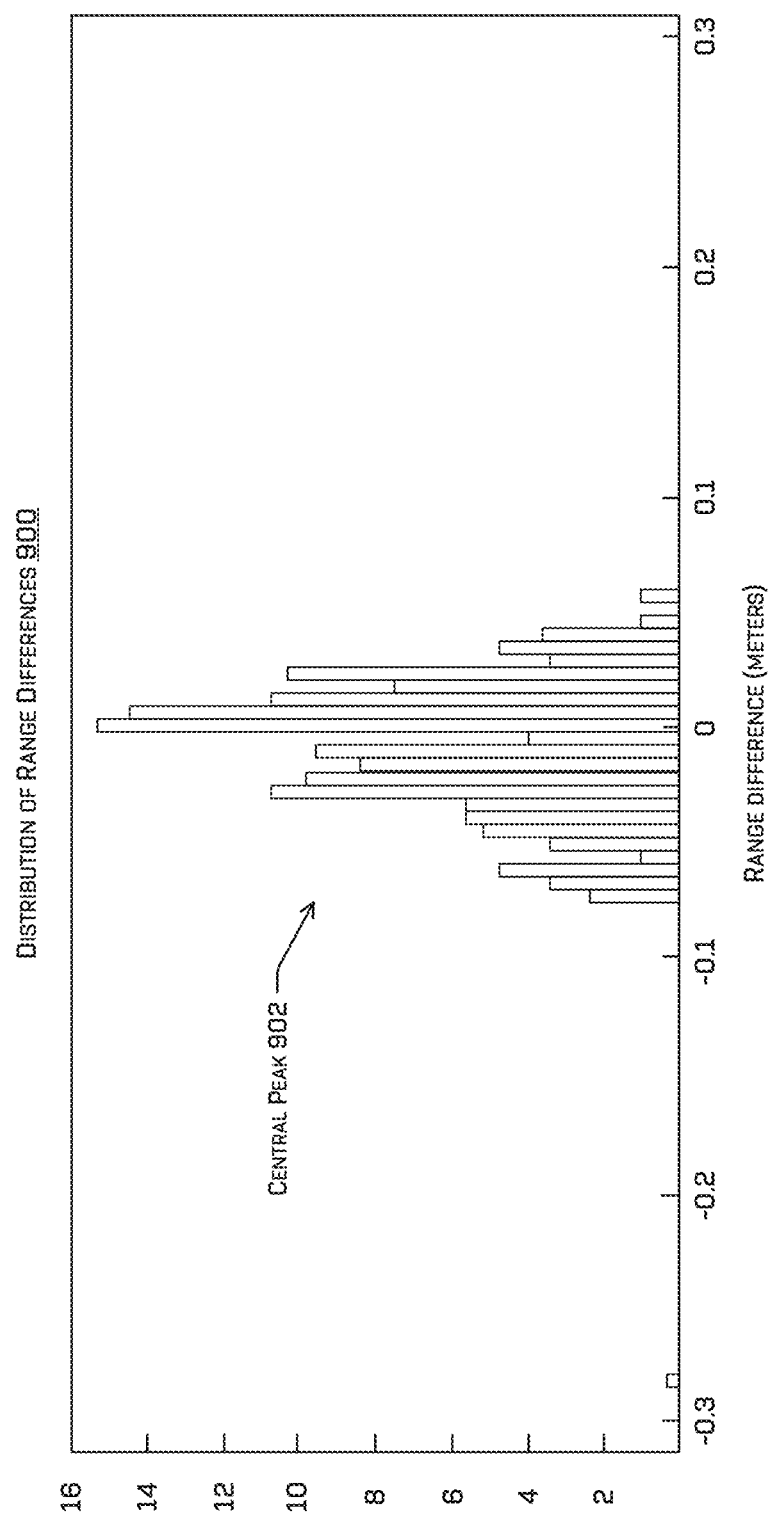
FIG. 10

LIDAR SENSOR DENOISING FOR ADVERSE CONDITIONS AND/OR NONSALIENT OBJECTS

BACKGROUND

Light detection and ranging or "lidar" refers to a technique for measuring distances to visible surfaces by emitting light and measuring properties of the reflections of the light. A lidar system has a light emitter and a light sensor. The light emitter may comprise a laser that directs light into an environment. When the emitted light is incident on a surface, a portion of the light is reflected and received by the light sensor, which converts light intensity to a corresponding electrical signal.

A lidar system has signal processing components that analyze reflected light signals to determine the distances to surfaces from which the emitted laser light has been reflected. For example, the system may measure the propagation time of a light signal as it travels from the laser emitter, to the surface, and back to the light sensor. A distance is then calculated based on the flight time and the known speed of light.

However, fine particulate matter may also reflect light. Problematically, fog, smoke, fog, exhaust, steam, and other such vapors may reflect light emitted by a lidar system. The lidar system may accordingly produce a false positive indication of the existence of a surface at the location of the vapor, even though no solid exists at the location.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 8 illustrates a closeup of the central peak of the distribution of range differences illustrated in FIG. 7.

FIG. 10 illustrates a closeup of the distribution of range differences illustrated in FIG. 9.

DETAILED DESCRIPTION

Figure 1A:
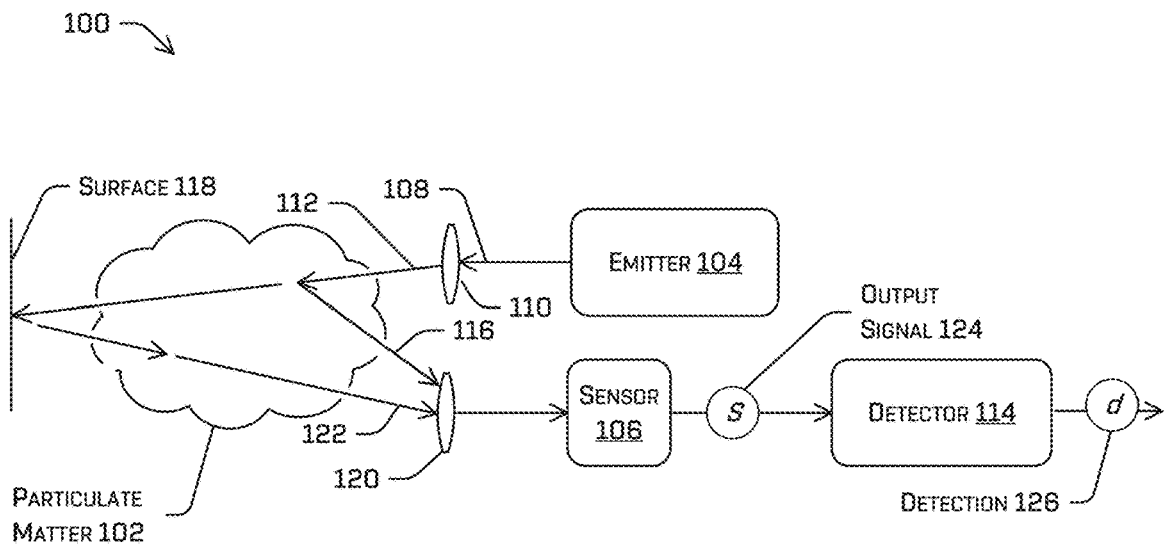
FIG. 1A illustrates a block diagram of components of an example lidar system, including reflected light attributable to particulate matter that may create a dual response and a channel comprising an emitter/sensor pair.

The techniques discussed herein may comprise identifying and/or removing (and/or otherwise ignoring, suppressing, and/or discarding) a portion of lidar data that isn't useful for vehicle travel. For example, this portion of lidar data may be associated with genuine returns but returns which have no impact on a solid object moving through (e.g., fog, smoke, exhaust, rain, debris, etc.). In such examples, though the returns correspond to real material, they are false in the sense that they should be ignored in certain contexts (e.g., driving). As used herein a false detection is a false positive indication that a surface exists in an environment surveyed by a light sensor such as, for example, a lidar device. In some examples, the false detection may be associated with a false return, which may be a false positive indication that a portion of an output signal of a sensor is associated with a "return," a signal generated responsive to a reflection of light emitted by an emitter of a same channel as the sensor. In some examples, a "return" may be a peak and/or other portion of a sensor signal that meets or exceeds a detection threshold.

The techniques discussed herein may comprise techniques for determining that lidar data comprises a false return (i.e., "detecting" a false return) and/or techniques for suppressing a false detection associated with the false return. In particular, the techniques discussed herein may detect when particulate matter is causing a false return and/or a false detection. Particulate matter or debris (e.g., leaves, plastic bag) may cause false returns in lidar data locally (i.e., in a specific region observed by the lidar sensor) and/or totally (i.e., in an entire or near-total region observed by a lidar sensor). For example, local interference caused by particulate matter may include exhaust from a tailpipe of a vehicle, steam from a manhole cover, rain and/or leaves in the air, smoke from an engine, etc., whereas global interference may comprise fog, non-local smoke (e.g., smoke from a forest fire), non-local smog, rain, etc. The techniques discussed herein may comprise different techniques for detecting local and/or global interferences attributable to particulate matter and/or debris, and the different techniques discussed herein may be conducted in any combination and/or singularly.

However, some false detections may obscure a true detection. For example, rain or fog may cause a lidar signal to be noisy and/or inaccurate. The techniques discussed herein reduce or remove this noise and permit detection of a solid object that impacts how the vehicle will plan its motion.

The techniques for denoising lidar data discussed herein may include receiving lidar data from at least two different lidar sensors and determining a cluster of lidar points based at least in part on the lidar data. Lidar data may comprise intensity data about the intensity of the return and/or a range indicating a distance the lidar device that emitted the light to a surface that reflected the light as the return. In some examples, determining the cluster may comprise using k-means, agglomerative clustering, mean shift clustering, density-based spatial clustering (DBSCAN), or the like to determine a cluster of lidar points based at least in part on their range data. Regardless of the technique used, the clustering algorithm may determine the cluster based at least in part on the distances between lidar points.

The techniques may include a metric-based approach and/or a machine-learned approach to denoise these lidar points. In an example using the metric-based approach, the techniques may include determining from which lidar device respective lidar points in the cluster were received as two lidar data sets, one of which is associated with a first lidar device and a second of which is associated with a second lidar device. The techniques may determine a difference in range indicated by corresponding points in the two sets of lidar device. For example, two corresponding points in the two sets of lidar device would be associated with a same location in the environment for a solid surface and would accordingly indicate a same or similar range. Note that, in some cases, depending on the positioning of the two lidar sensors, the range wouldn't be identical because of the parallax effect, hence the need to indicate that the two ranges indicated by the two lidar points received from the two lidar devices may be similar rather than perfectly identical. Moreover, environmental and/or sensor noise, caused by signals traversing the environment or due to the design of the lidar sensors or variations between sensors, may introduce some variation in the range as well.

Regardless, the metric-based approach may determine a distribution of differences in range indicated by the two sets of lidar data. The techniques may then comprise determining a metric based at least in part on the distribution. For example, determining the metric may include determining a standard deviation of the distribution, a standard deviation of a central peak of the distribution, and/or a ratio of outlier differences (e.g., the number of differences that have a difference value that meets or exceeds a threshold difference value) to total number of differences determined. If either of the standard deviations or the ratio meets or exceeds a threshold standard deviation or threshold ratio, respectively, the lidar points associated with differences that meet or exceed the threshold difference may be suppressed as noise. Those lidar points associated with a difference that is less than the threshold difference may be retained, as they are likely associated with a solid surface that is relevant to vehicle travel.

In some examples, the metric may be additionally or alternatively used to determine an effective range of the lidar devices, which may be used as part of controlling an operation of a vehicle. The effective range may be a distance at which the lidar devices are estimated to determine a range and/or intensity at a threshold accuracy. Additionally or alternatively, the metric may be used to distinguish debris from particulate matter (e.g., by using different thresholds for distinguishing debris from particulate matter, debris from another solid object, and/or particulate matter from another solid object).

In examples using the machine-learned approach, the two sets of lidar data may be converted into two images. These images may indicate, in different channels, the respective set of lidar data's range data, intensity data, and/or the lidar device that generated the lidar data. A convolutional network or other machine-learned model may be trained to use these images to determine a classification or a likelihood that a point of the first subset or the second subset is relevant or irrelevant to vehicle travel or a prediction that the point belongs to a bin indicating a range of likelihoods that the point is irrelevant to vehicle travel. In some examples, the techniques may include suppressing those points classified as being associated with a false return or having a likelihood thereof of which meets or exceeds a threshold likelihood.

Once the techniques determine that a lidar point is a false return according to either approach, the techniques may include suppressing the false return from being identified as a detection. This suppression may be accomplished by preventing the lidar system from positively identifying the detection as a true positive detection. Preventing the lidar system from identifying the detection as a true positive detection may include discarding an output signal, associating a false return identifier with the lidar point (for use by downstream components), and/or associating the metric, classification, and/or likelihood with that lidar point.

Similarly, a false detection that was not suppressed by the lidar system may be suppressed by a downstream component of the perception component based at least in part on determining that a detection is a false detection. In some examples, this may comprise deleting the false detection and/or setting a new value for the false detection. In at least some examples, such measurements may not be suppressed, but otherwise associated with an uncertainty (or certainty/probability) that the return is associated with fog, exhaust, steam, or otherwise. As such, a planner (e.g., of a robotic platform) may discount, or otherwise account for, such points.

The techniques discussed herein may improve the accuracy of lidar detections by reducing the number of false returns generated by a lidar device and/or the number of false detections appearing in a depth map generated based at least in part on lidar data. The techniques discussed herein may accordingly improve the safety and accuracy of operation of systems that rely on detections generated by a lidar device. For example, the techniques may remove noise attributable to particulate matter and/or false returns associated with debris, which may prevent the vehicle from making risky maneuvers to avoid these false returns, while continuing to detect true positives that may be partially obscured. This latter part may ensure that the vehicle still detects true positives, like signage, pedestrians, and/or vehicles that may be partially obscured by particulate matter and/or debris. That way the vehicle still uses true positive as part of controlling the vehicle, thereby increasing the safety of operation of the vehicle during adverse (e.g., windy weather blowing debris, rainy, foggy, smoky, smoggy) weather. Moreover, the techniques may reduce over-segmentation of objects (e.g., including both a solid object and particulate matter or debris in a single object detection) in adverse weather conditions and/or detecting localized particulate matter or debris independently as its own particulate matter/debris detection.

In some examples, each lidar return can be associated with a confidence score or similar metric indicative of how likely the return can be used in the disclosed techniques. For example, aspects of the disclosure include using returns from two or more lidar sensors to determine if a return is associated with particulate matter or debris. In some examples, a determined location of an object corresponding to a return may be indicative of how applicable a return in that area is to the disclosed techniques. For example, some sensors may have a limited field of view due to the design of the sensor and/or their placement on the vehicle. Sensor reading on the edge of a field of view of a sensor may be influenced by bumps, changes in vehicle or sensor housing conditions, moving alignments, etc. and therefore may be less confidently used in the disclosed techniques as opposed to sensor readings more reliably fall within an overlap region between sensors. Similarly, environment features inferred from maps (e.g., at specified locations) and/or certain vehicle maneuvers may influence how well the disclosed techniques can infer correlation between different sensor readings the confidence score may be used to characterize this. In some examples, the techniques discussed herein may comprise determining, by a machine-learned model, a confidence score associated with a lidar return based at least in part on a relative location of the lidar return within a field of view of the sensor, other sensor data (e.g., movement data received from a gyroscope), environment data, and/or the like. The techniques may additionally or alternatively include filtering the lidar data based at least in part on confidence score(s) associated therewith, such that the techniques discussed herein may use sensor data associated with confidence scores that meet or exceed a confidence score threshold.

Example Scenario

FIG. 1A illustrates a block diagram of components of an example lidar system 100 that may comprise one or more channels and suppress false detections (or otherwise provide associated probabilities of being associated with particulate matter returns). The depicted example illustrates an example scenario in which particulate matter 102 may interfere with operation of a channel the lidar system 100, although it's understood other things may interfere with the lidar return, such as debris.

The example lidar system 100 in FIG. 1A depicts a single channel, although the example lidar system 100 may comprise any number of channels. A channel may be used to emit a laser light pulse and to measure properties of the reflections of the emitted light pulse, as explained below, and may comprise at least an emitter-sensor pair, such as, for example, emitter 104 and corresponding sensor 106. One skilled in the art would understand that the light emitters and light sensors may be multiplied in number beyond the single laser emitter and light sensor depicted. For example, a first channel may measure a distance to any detectable surface in a first direction of an environment surrounding the example lidar system 100, whereas a second channel may measure a distance to any detectable surface in a second direction, where the first direction and the second direction are separated by three to five degrees, for example. The term "channel" may also encompass supporting circuitry that is associated with the emitter/sensor pair and at least some of the supporting circuitry may be shared among multiple channels (e.g., detector(s), digital-to-analog converter (DAC), analog-to-digital converter (ADC)). However, the techniques discussed herein may be applied to flash lidar, which may not have discrete channels and may, instead, have one or more detectors that are not specifically associated with a particular emitter. In some examples, adjacent channels of example lidar system 100 may be disposed within a housing of the example lidar system 100 to emit light and/or receive light along different azimuths and/or altitudes. Note, also, that although FIG. 1A depicts a lidar system, the techniques discussed herein may additionally or alternatively applied to a time of flight (ToF) system, a RADAR system, etc.

In some examples, emitter 104 may include a laser emitter that produces light of a wavelength between 600 and 1000 nanometers. In additional or alternate examples, the wavelength of emitted light may range between 10 micrometers to 250 nm. The emitter 104 may emit light (e.g., laser pulses) that varies in power and/or wavelength. For example, some of the laser emitters of the example lidar system 100 may emit light at 905 nanometers, and others of the laser emitters may emit light at 1064 nanometers. The laser emitters of the different wavelengths can then be used alternately, so that the emitted light alternates between 905 nanometers and 1064 nanometers. The sensor 106 may be similarly configured to be sensitive to the respective wavelengths and to filter other wavelengths.

For a single distance measurement via the depicted channel, emitter 104 may be controlled to emit a burst of light pulses 108 (i.e., one or more) through a lens 110 as emitted pulse 112 and the corresponding sensor 106 may be powered on and/or otherwise allowed to pass a signal generated by the sensor 106 to detector 114. In some examples, the detector 114 may read a signal generated by the sensor 106 by opening a switch corresponding to the sensor 106. A sensor is considered "active," according to the discussion herein, when the signal output by a sensor is being read by the detector 114 and/or otherwise being relied on to determine whether or not the output signal indicates the existence of a surface.

In the example scenario, the emitted pulse 112 may be partially or completely reflected by particulate matter 102 as reflection 116 (also referred to herein as reflected light). For example, particulate matter 102 may comprise water particles and/or droplets, dust particles, vehicle emissions, smoke particles, debris, etc. In some cases, part of the emitted pulse 112 may, in some cases and depending on the density and/or type of the particulate matter 102, pass through the particulate matter 102, and be reflected by a surface 118 behind the particulate matter 102 along an azimuth associated with the channel, which is depicted in FIG. 1A as reflection 122. In some examples, all or part of reflection 122 may pass through the particulate matter 102 on a return path and be received at sensor 106. The reflection 116 may pass through a lens 120 to sensor 106.

In some examples, the lens 110 and the lens 120 may be the same lens, depicted redundantly for clarity. In some examples, the lidar may include multiple laser emitters positioned within a chassis to project laser light outward through the one or more lenses. In some examples, the lidar may also include multiple light sensors so that light from any particular emitter is reflected through the one or more lenses to a corresponding light sensor. In other examples, the lens 120 may be a second lens designed so that beams from different emitters at different physical positions within a housing of the lidar are directed outwardly at different angles. Specifically, the lens 110 may be designed to direct light from the emitter of a particular channel (e.g., emitter 104) in a corresponding and unique direction. The lens 120 may be designed so that the corresponding sensor (e.g., sensor 106) of the channel receives reflected light from the same unique direction to disambiguate between light received through the lens 120 that is attributable to reflections of light emitted by other emitter(s).

In some examples, the sensor 106 may comprise a photomultiplier (e.g., silicon photomultiplier (SiPM)), photodiode (e.g., avalanche photodiode (APD), single-photon avalanche diode (SPAD)), and/or other device that converts light intensity at the sensor to a corresponding electrical signal (output signal 124). A portion of the output signal 124 generated by the sensor 106 may be attributable to the reflection 116 and/or 122. This portion of the output signal 124 may be termed a "return" and/or "return signal." Where the output signal 124 comprises a portion attributable to a reflection off the surface 118 and the particulate matter 102, the output signal would be said to comprise two (or more) returns (e.g., two portions of the output signal that have an amplitude and/or power that meet or exceed a detection threshold).

A return signal attributable to reflection off a surface 118 (without any interference from particulate matter 102) may generally be of the same shape as the light pulse 108 emitted by the emitter 104, although it may differ to some extent as a result of noise, interference, cross-talk between different emitter/sensor pairs, reflectivity of the surface 118 (e.g., whether the surface is L'Ambertian, retroreflective, etc.), diffusion, an angle of the surface 118, interfering signals, and so forth. The return signal will also be delayed with respect to the light pulse 108 by an amount corresponding to the round-trip propagation time of the emitted laser burst (i.e., the time delay of arrival). However, the return signal attributable to reflection of particulate matter 102 may not share the shape of light pulse 108.

In some examples, the detector 114 may read the output signal(s) generated by the sensor(s) of any currently active channels to determine whether any of the output signal(s) include a return signal (e.g., output signal 124 of sensor 106). For example, the detector 114 may determine whether an amplitude, energy, trigger event count (e.g., every instance an avalanche is triggered at a SPAD), and/or any other indication of a reception of a reflection of light emitted by an emitter of a channel, satisfies a detection threshold (e.g., meets or exceeds a detection threshold in amps, in Joules, arbitrary number (e.g., a number of counts, or units, as output from an ADC). For example, if the sensor 106 is active, the detector 114 may monitor the output signal 124 of the sensor 106 to determine whether an amplitude of the output signal 124 meets or exceeds the detection threshold. If a portion of the output signal 124 meets or exceeds the detection threshold, the detector 114 may indicate that portion as being a return signal and/or may output a detection 126. For example, the detector 114 may determine a time delay of arrival between emission of the light pulse 108 and receiving the reflected light pulse at the sensor 106 (i.e., as indicated by a relative time of the return signal) and/or a distance measurement corresponding to the time delay of arrival. In some examples, the detection 126 may comprise a distance measurement and/or a spatial position (e.g., a position within a depth map and/or voxel representation).

The detector 114 may be implemented in part by a field-programmable gate array ("FPGA"), an application-specific integrated circuit (ASIC), a microcontroller, a microprocessor, a digital signal processor ("DSP"), and/or a combination of one or more of these and/or other control and processing elements, and may have associated memory for storing associated programs and data.

Without implementing the techniques discussed herein, the detection 126 may be a false detection (i.e., a false positive indication of the existence and/or position of a surface in an environment surrounding the example lidar system 100) if the detection 126 indicates a position of/distance to the particulate matter 102. Moreover, a naïve system that does not implement the techniques discussed herein may incorrectly suppress the detection 126 if the detection 126 is associated with both the surface 118 and the particulate matter 102. The techniques discussed herein may comprise techniques for determining a detection associated with the surface 118 and suppressing a detection associated with the particular matter 102. In at least some examples, a detection 126 may not be suppressed, but otherwise associated with an uncertainty (or certainty/probability) that the return is associated with fog, exhaust, steam, or otherwise. As such, a planning component (e.g., of a robotic platform) may discount, or otherwise account for, such detections.

Example Scenario

Figure 1B:
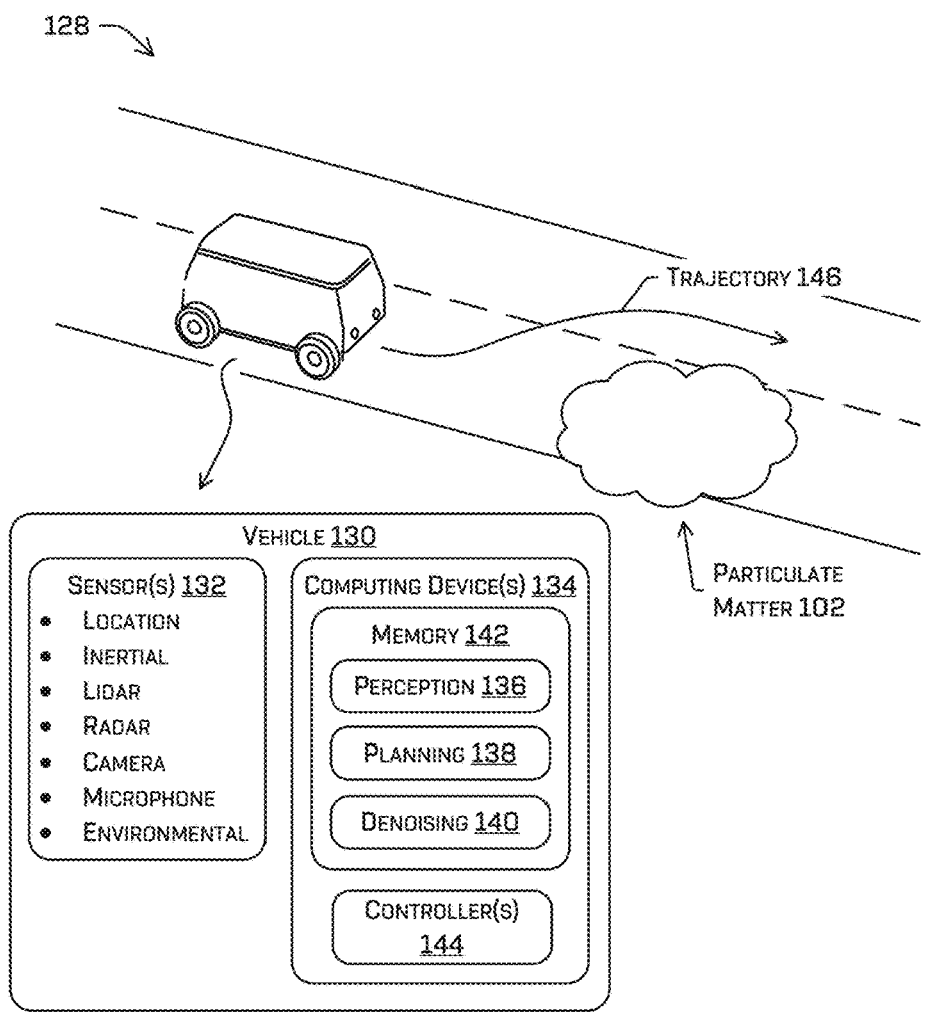
FIG. 1B illustrates an example scenario depicting an autonomous vehicle coming upon particulate matter and the potential effect caused by a false object detection associated with the particulate matter.

FIG. 1B illustrates an example scenario 128 in which false detections may deleteriously affect the operation of a machine that relies on the accuracy of lidar detections, such as a vehicle 130. In some instances, the vehicle 130 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 130 may be a fully or partially autonomous vehicle having any other level or classification. Moreover, in some instances, the guidance isolation techniques described herein may be usable by non-autonomous vehicles as well. It is contemplated that the techniques discussed herein may apply to more than robotic control, such as for autonomous vehicles. For example, the techniques discussed herein may be applied to mapping, manufacturing, augmented reality, etc.

According to the techniques discussed herein, the vehicle 130 may receive sensor data from sensor(s) 132 of the vehicle 130. For example, the sensor(s) 132 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a visual light camera, a thermal imaging camera), an audio sensor (e.g., a microphone), and/or environmental sensor (e.g., a barometer, a hygrometer, etc.).

In some examples, the autonomous vehicle may include computing device(s) 134 that executes a perception component 136, a planning component 138, and/or a denoising component 140 stored on a memory 142. The computing device(s) 134 may further include one or more controllers, controller(s) 144 that generate instructions for actuating a drive system of the vehicle 130 to track a trajectory 146 generated by the planning component 138. The perception component 136, the planning component 138, and/or denoising component 140 may include one or more machine-learned (ML) models and/or other computer-executable instructions to reduce and/or suppress the presence of false returns in lidar data. In some examples, the controller(s) 144 may include instructions stored in a memory, although the controller(s) 144 may additionally or alternatively include a specialized computing device that comprises hardware and/or software for actuating drive components of the vehicle 130.

In general, the perception component 136 may determine what is in the environment surrounding the vehicle 130 and the planning component 138 may determine how to operate the vehicle 130 according to information received from the perception component 136. The perception component 136 may generate perception data, which may comprise data associated with static objects in the environment (static data) and/or data associated with dynamic objects in the environment (dynamic data). For example, the static data may indicate a likelihood that an object exists at a location in the environment and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). For example, the dynamic data may indicate a current position, heading, velocity, and/or the like associated with a dynamic object and at one or more future times.

The perception component 136 may additionally or alternatively determine an object classification associated with an object. An object classification may distinguish between different object types such as, for example, a passenger vehicle, a pedestrian, a bicyclist, a delivery truck, a semi-truck, traffic signage, and/or the like. The perception component 136 may additionally or alternatively determine a track associated with an object, which may comprise a historical, current, and/or predicted object position, velocity, acceleration, and/or heading. The track may additionally or alternatively associate sensor data or object detections from different times with a same object. In other words, the track may identify different object detections in time as being a associated with a same object.

The perception component 136 may additionally or alternatively comprise a prediction component that determines an estimate of a future action and/or movement (i.e., a prediction) that a dynamic object may take based at least in part on sensor data (which may comprise lidar data). In some examples, the prediction may be based at least in part on a mode of operation and/or trajectory of the vehicle. For example, the dynamic data may comprise a first prediction associated with a first vehicle mode and a first time and a second prediction associated with a second vehicle mode and the first time. The vehicle modes may include mission-level modes, such as passenger pickup, passenger transit, passenger deliver, or the like; path or trajectory-level modes such as maintaining trajectory, slowing to a stop, transitioning lanes, executing a righthand turn, or the like; and/or signal modes, such as activating a speaker, activating a turn light, flashing headlights or high beams, or the like. The autonomous vehicle's behavior and signals may affect decisions and behavior made by other entities in the vicinity of the autonomous vehicle 130 and may thereby affect the predicted motion of other objects.

In some examples, the perception component 136 may receive sensor data from the sensor(s) 132 and determine data related to objects in the vicinity of the vehicle 130 (perception data), such as the static and/or dynamic data, which may include prediction data related thereto. The perception data may include the static and/or dynamic data, a heat map (which may indicate a confidence indicating that a classification is correct and/or an indication that an object or object of a specific classification is occupying or will occupy a discrete portion of the environment, for example), object classifications associated with detected objects, instance segmentation(s), semantic segmentation(s), two and/or three-dimensional bounding boxes, tracks, etc.

For example, the perception component 136 may include a computer vision machine-learned model configured to receive sensor data, such as visual light images and/or thermal images, and classifying a portion of such an image as being associated with particulate matter 102. Additionally or alternatively, the denoising component 140 may be part of the perception component 136 and may include a machine-learned model configured to receive sensor data, such as lidar and/or radar data, and determine that a portion thereof is associated with particulate matter 102 and/or other matter that may be disregarded for the purposes of vehicle travel, such as debris.

In some examples, the denoising component 140 may be part of the perception component 136. For example, the denoising component 140 may receive sensor data and determine that at least a portion of the sensor data may be suppressed or indicated as being associated with particulate matter or debris. The denoising component 140 may comprise one or more machine-learned models and/or software and/or hardware.

In some examples, the perception component 136 and/or denoising component 140 may comprise a pipeline of hardware and/or software, which may include one or more GPU(s), ML model(s), Kalman filter(s), and/or the like. In some examples, the perception component 136 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. The perception component 136 may be configured to detect as many objects and information about the environment as possible to avoid failing to account for an event or object behavior that should be taken into account by the planning component 138 in determining a trajectory for controlling motion of the vehicle.

The data produced by the perception component 136 may be collectively referred to as perception data, which may be provided to the planning component 138. In some examples, perception data may comprise outputs of sensor specific pipelines (e.g., vision, lidar, radar) and/or hybrid sensor pipelines (e.g. vision-lidar, radar-lidar). In some instances, the perception data may be based at least in part on lidar data received from a lidar device of the sensor(s) 132. The denoising component 140 may output a likelihood that an object exists beyond particulate matter 102 (from the perspective/position of the vehicle 130) and/or an indication of whether a return is associated with particulate matter/debris or with a solid surface (e.g., pedestrian, vehicle, roadway).

The planning component 138 may determine instructions for controlling operations of the vehicle 130 based at least in part on perception data that may be based on lidar data received from the lidar device. In particular, the planning component 138 may rely on one or more lidar device(s) of the sensor(s) 132 to determine the existence and/or position(s) of object(s) in order to safely and efficiently control operation of the vehicle 130. False positive detections of the existence of a surface by a lidar device may degrade operation of a machine that relies on lidar data, like vehicle 130. Moreover, wrongly attributing split returns as being particulate or translucent matter merely by virtue of being split returns may be very dangerous since solid opaque objects can cause split returns at times.

In some examples, a lidar detection may comprise an indication of a distance to a detected surface calculated based at least in part on a time of delay of arrival of a reflection of light emitted by an emitted of the lidar device, as discussed above. In some examples, a processor of the lidar device and/or the perception component 136 may determine a position of the surface relative to an axis of the lidar device and/or the vehicle 130 based at least in part on a known position and/or orientation of the lidar device and/or the channel (e.g., altitude and/or azimuth.).

The planning component may determine, based at least in part on perception data, including any indications that a split return is or is not associated with particulate matter and/or a likelihood or probability map of an object's existence beyond particulate matter 102 from the lidar sensor, a plurality of candidate trajectories for controlling motion of the vehicle 130 in accordance with a receding horizon technique (e.g., 1 micro-second, half a second, 2 seconds, 5 seconds, 10 seconds, or any other near-term time period) to control the vehicle to traverse the route (e.g., in order to avoid any of the detected objects); and determine one of the candidate trajectories as a trajectory 146 that may be used to generate a drive control signal that may be transmitted to the controller(s) 144 for actuating drive components of the vehicle 130. In order to generate such a trajectory 146, the perception component may determine controls sufficient to arrive at the position and/or orientation identified by the trajectory 146.

FIG. 1 depicts an example of a trajectory 146 that may ultimately be selected from among candidate trajectories according to the techniques discussed herein, represented as an arrow indicating a target steering angle, target steering rate, target velocity, and/or target acceleration for the controller(s) 144 to track, although the trajectory itself may comprise instructions for controller(s), which may, in turn, actuate a drive system of the vehicle 130. The depicted trajectory 146 may be an example of a trajectory that may be generated by wrongly detecting the particulate matter 102 as a solid surface that is relevant to vehicle travel and accordingly needs to be avoided.

Example System

Figure 2:
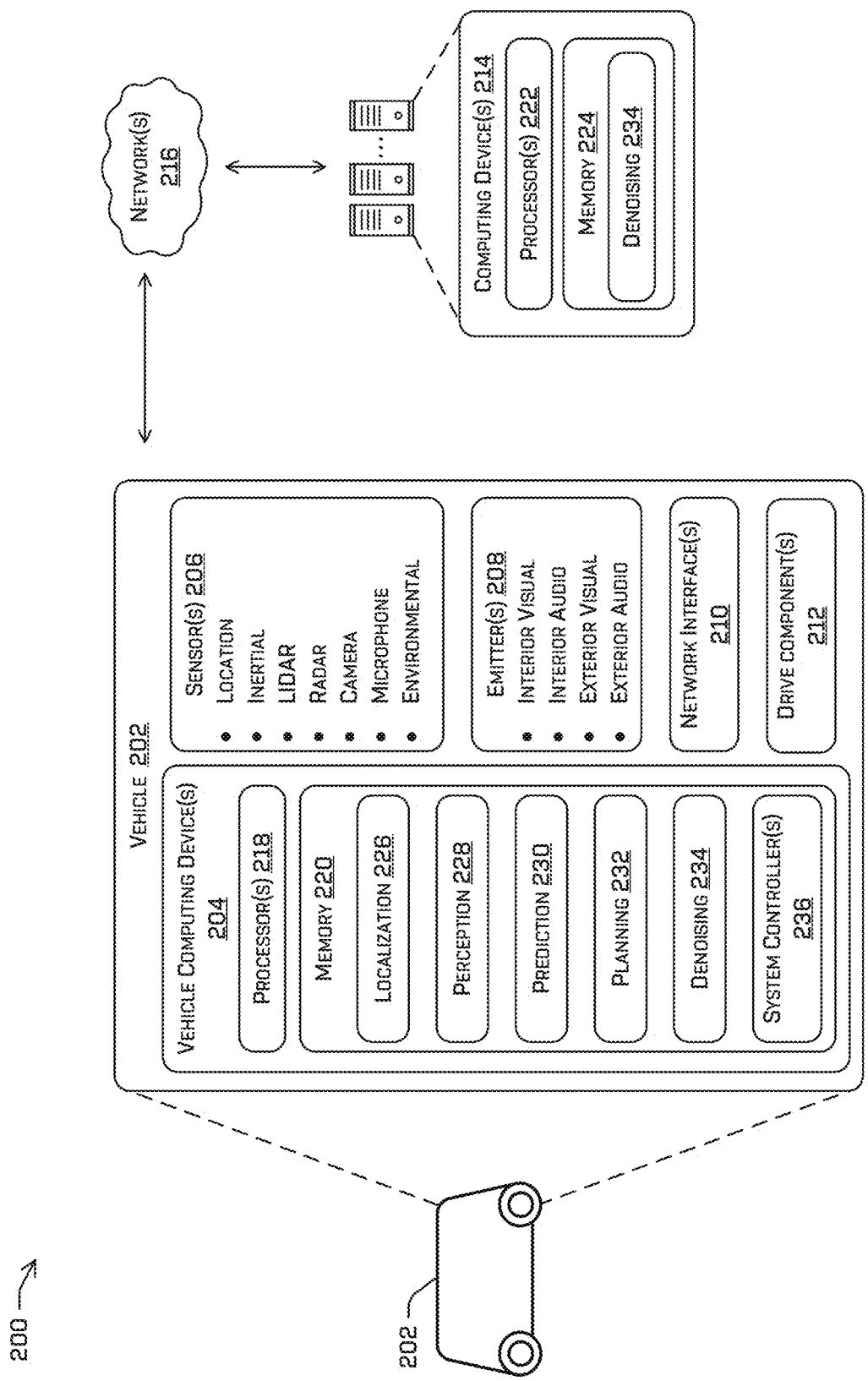
FIG. 2 illustrates a block diagram an example system architecture including a vehicle comprising a denoising component.

FIG. 2 illustrates a block diagram of an example system 200 that implements the techniques discussed herein. In some instances, the example system 200 may include a vehicle 202, which may represent the vehicle 130 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well. In some examples, the techniques discussed herein may be applied to mining, manufacturing, augmented reality, etc. Moreover, even though the vehicle 130 is depicted as a land vehicle, vehicle 130 may be an aircraft, spacecraft, watercraft, and/or the like.

The vehicle 202 may include a vehicle computing device(s) 204, sensor(s) 206, emitter(s) 208, network interface(s) 210, and/or drive component(s) 212. Vehicle computing device(s) 204 may represent computing device(s) 134 and sensor(s) 206 may represent sensor(s) 132. The system 200 may additionally or alternatively comprise computing device(s) 214.

The sensor(s) 206 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 142. Computing device(s) 214 may also include processor(s) 222, and/or memory 224. Memory 220 and/or 224 may store processor-executable instructions that, when executed by one or more processors, e.g., processor(s) 218 and/or 222, cause a system to perform various operations discussed herein. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), data processing units (DPUs), integrated circuits (e.g., application-specific integrated circuits (ASICs)), gate arrays (e.g., field-programmable gate arrays (FPGAs)), artificial intelligence (AI) hardware and/or accelerator (which may be any one or more of the previous processors or a stand-alone purpose designed chip) and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), double data rate synchronous dynamic random-access memory (DDR SDRAM), hard disk drive (HDD), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, denoising component 234, and/or system controller(s) 236—zero or more portions of any of which may be hardware, such as GPU(s), CPU(s), TPU(s), FPGA(s), and/or other processing units. Perception component 228 may represent perception component 136, planning component 232 may represent planning component 138, denoising component 234 may represent denoising component 140, and controller(s) 236 may represent controller(s) 144.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data. In some examples, localization component 226 may provide, to the perception component 228 and/or prediction component 230, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects in the environment. For example, the top-down representation may be an image with additional data embedded therein, such as where various pixel values encode the perception data discussed herein. In some examples, the perception component 228 may include the denoising component 234, although in additional or alternate examples, the denoising component 234 may be a separate component, e.g., by virtue of being a separate pipeline from the perception component 228.

The prediction component 230 may predict a future state of an object in the environment surrounding the vehicle 202. For example, the future state may indicate a predicted object position, orientation, velocity, acceleration, and/or other state (e.g., door state, turning state, intent state such as signaling turn) of that object. Data determined by the prediction component 230 is referred to as prediction data. In some examples, the prediction component 230 may determine a top-down representation of a predicted future state of the environment. For example, the top-down representation may be an image with additional data embedded therein, such as where various pixel values encode the prediction data discussed herein.

The planning component 232 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 232 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

The denoising component 234 may comprise software and/or hardware for receiving lidar data and determining a portion of the lidar data to suppress based at least in part on determining that the portion is associated with particulate matter and/or debris according to the techniques discussed herein. In examples where the denoising component 234 includes one or more machine-learned models, the denoising component 234 may be trained on computing device(s) 214 and transmitted to the vehicle 202 for storage in memory 220. In some examples, training such a machine-learned model may include ground truth data comprising lidar data that has labels associated therewith that indicate whether or not a lidar point is associated with particulate matter or debris. The machine-learned model may be trained using gradient descent based at least in part on providing the lidar data as input to the machine-learned model, as discussed herein, and determining a difference (e.g., a loss) between the output of the machine-learned model and the labels indicated by the lidar data. This loss may be backpropagated and one or more parameters of the machine-learned model may be altered to reduce the loss using gradient descent. For example, these parameter(s) may include a weight, bias, or other parameter associated with a neural network, transformer, or the like. This may be repeated until a receiver operating characteristic curve, area under classification curve, confusion matrix, or the like indicate an accuracy and/or recall that meet or exceeds a threshold accuracy and/or recall.

The memory 220 and/or 224 may additionally or alternatively store a mapping system, a planning system, a ride management system, simulation/prediction component, etc.

As described herein, the localization component 226, the perception component 228, the prediction component 230, the planning component 232, the denoising component 234, and/or other components of the system 200 may comprise one or more ML models. For example, localization component 226, the perception component 228, the prediction component 230, the planning component 232, and/or the denoising component 234 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like;

visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, RoBERTa, XLNet, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236 (which may be a portion of the drive component(s)), which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 232 may generate instructions based at least in part on perception data generated by the perception component 228 and/or denoising component 234 and/or simulated perception data and transmit the instructions to the system controller(s) 236, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Lidar Data Associated with Particulate Matter/Debris

Figure 3:
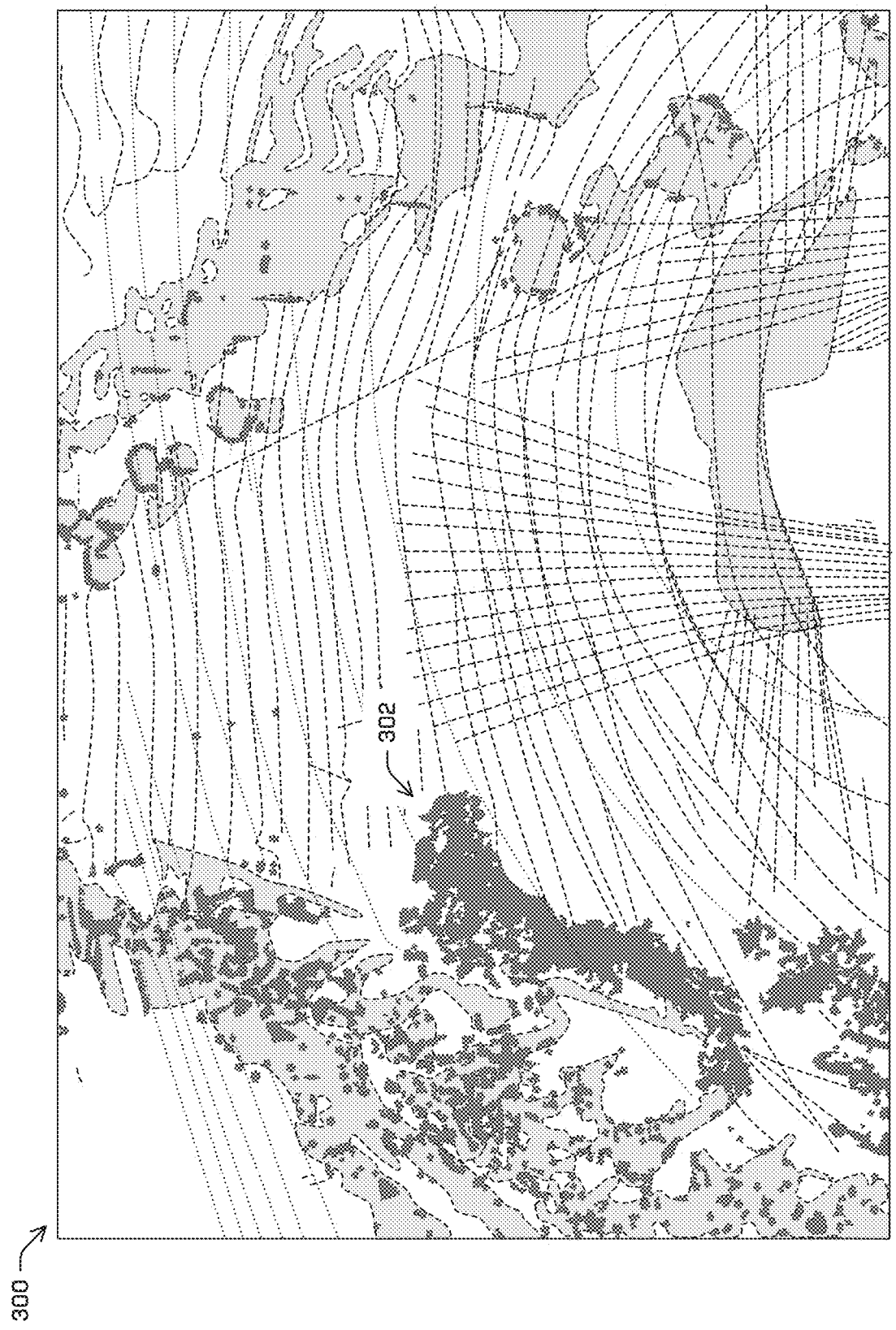
FIG. 3 illustrates lidar returns associated with various objects, including returns indicating variable ranges (illustrated in dark gray).

FIG. 3 illustrates an aerial view of example lidar data 300 that includes lidar returns associated with various objects, including returns indicating variable ranges (illustrated in dark gray), which may be associated with particulate matter and/or debris. For example, the cluster of lidar returns indicated by element 302 may be associated with particulate matter or other debris, while other dark gray portions may be associated with the fringes of trees or debris.

Figure 4:
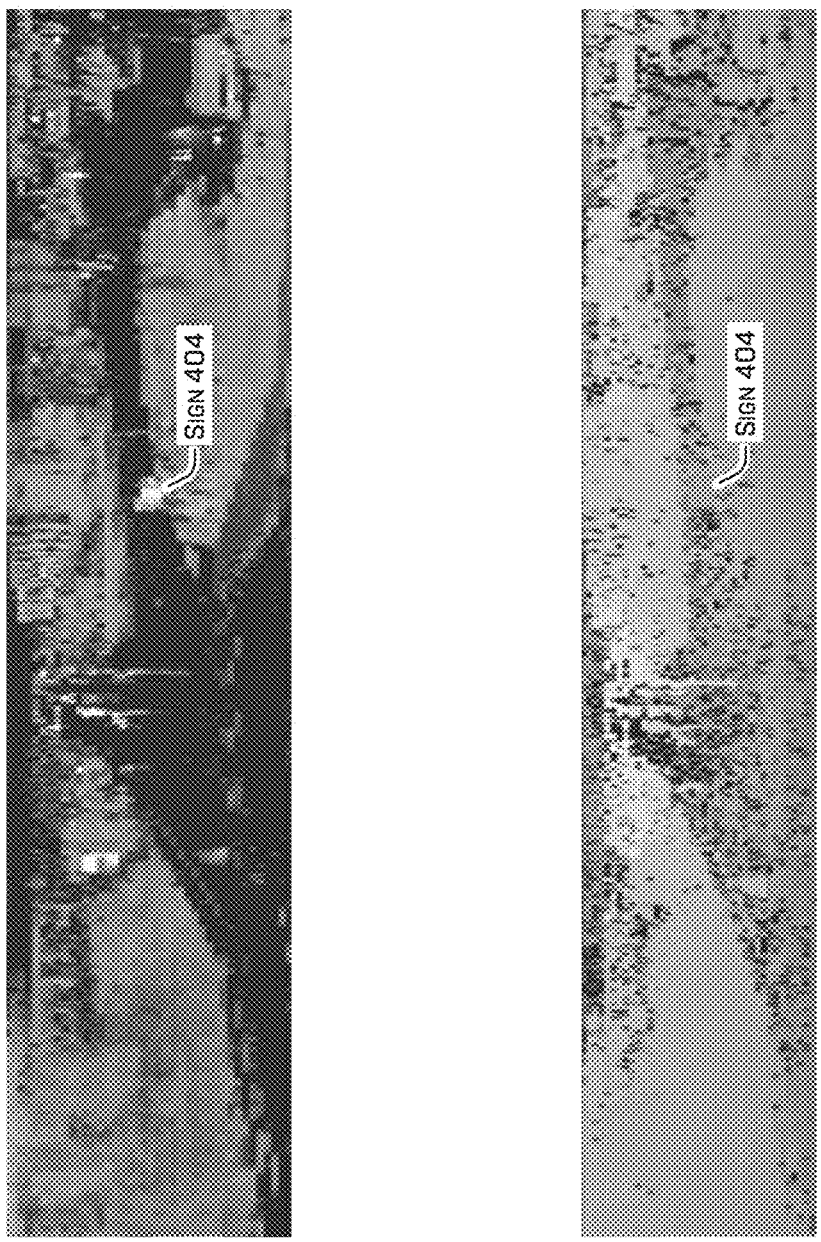
FIG. 4 illustrates lidar data comprising intensity data and range data for a same scene.

FIG. 4 illustrates additional example lidar data comprising intensity data 400 and range data 402 for a same scene. Lidar data for a single return may indicate a range to the object that reflected the emitted light pulse and/or an intensity of the return, which may be indicated by a power (e.g., in decibels) of the return light incident on a lidar sensor. The lidar data may additionally or alternatively indicate the lidar device that generated a lidar point.

The environment in which this example lidar data was collected was rainy and slightly foggy. Notably, the intensity data 400 is less affected by the presence of this particulate matter and it's easier to perceive that the scene depicts a main roadway and a junction with another roadway, along with some features off the road no either side, including a sign 404.

However, the range data 402 is significantly more noisy, which is problematic because a vehicle relying on the range data 402 may falsely detect the presence of a solid object in the roadway if enough of this noise accumulates in one spot or across the roadway to meet thresholds for detecting an object.

Example Overview of Part of the Denoising Techniques

Figure 5:
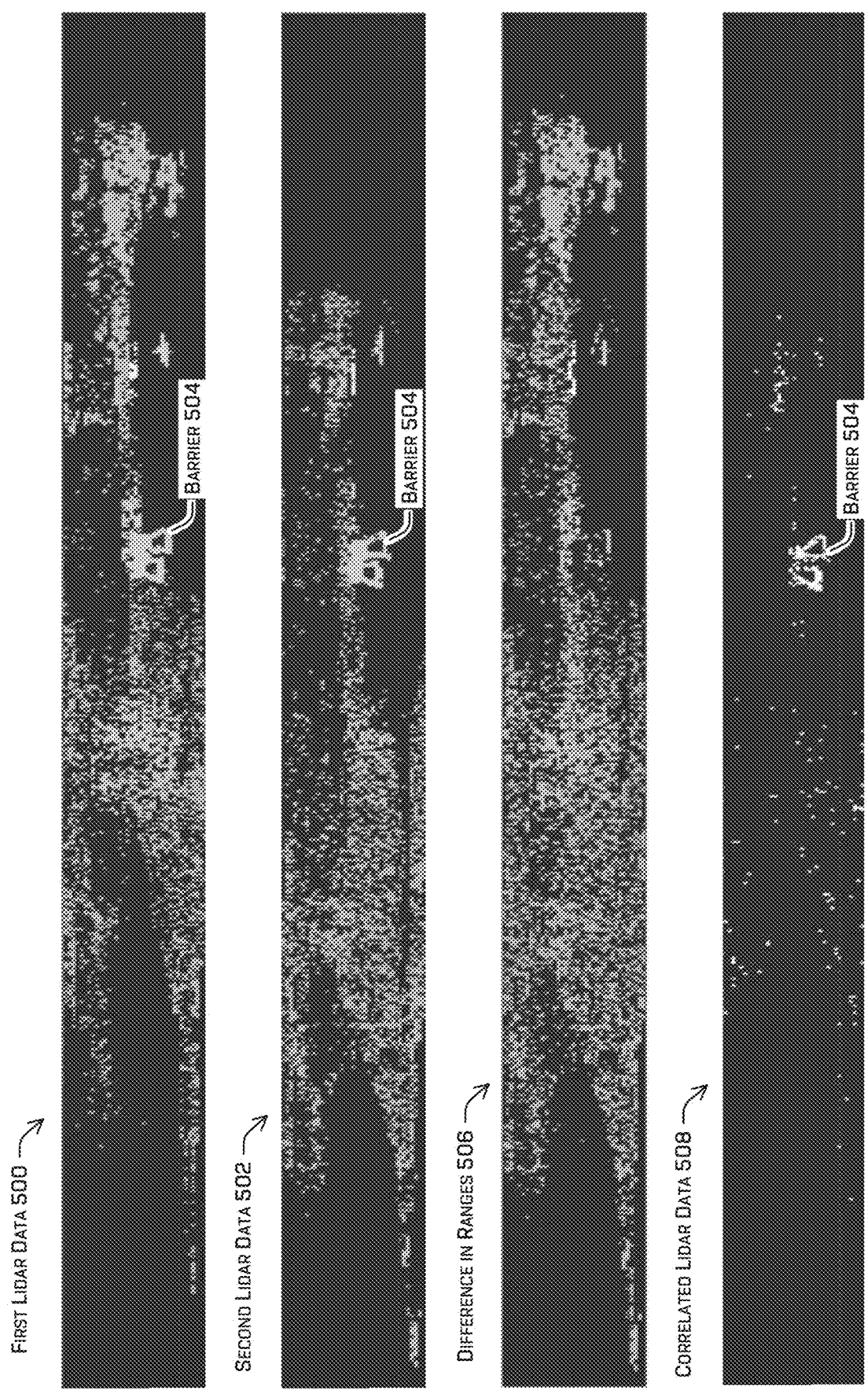
FIG. 5 illustrates two sets of lidar range data received from two different lidar devices, the difference between the two sets, and the portion of the two sets that is correlated.

FIG. 5 illustrates two sets of lidar range data received from two different lidar devices, the difference between the two sets, and the portion of the two sets that is correlated. Both sets of lidar data depicted may indicate range data for a scene, which may be part of the total data indicated by the two sets of lidar data. For example, the two sets of lidar data may further indicate a reflectivity/intensity of a return and that return's elevation and azimuth relative to a center of a field of view of the respective lidar device. The first lidar data 500 may be received from a first lidar device and the second lidar data 502 may be received from a second lidar device. In some examples, the lidar data may be associated by converting the two sets of lidar data into a common space to account for parallax, which is attributable to the difference in position of the two lidar sensors. This is sometimes called a parallax-aware pixel or voxel mapping.

Both lidar data sets are quite noisy, but one can see that they both include true returns associated with a barrier 504. The techniques discussed herein may include determining a difference in ranges 506 between the first lidar data 500 and the second lidar data 502, as discussed in more detail below. Histograms of this difference in ranges are depicted at FIGS. 7-10. FIG. 5 also depicts correlated lidar data 508 that may comprise those lidar points that are correlated between the two sets of lidar data. As discussed below, the correlated lidar data 508 may be determined by cross-correlation and/or by determining the lidar points that are associated with a difference in range indicated by the two lidar data sets that is below a threshold difference. In some examples, the correlated lidar data 508 may include a true positive solid object, such as the barrier 504, or at least enough returns associated with the barrier 504 such that the barrier 504 or other solid object(s) may be detected as a solid object that should be used as part of vehicle operation planning. Although the correlated lidar data 508 is not a perfect reconstruction of the object, due to the noise introduced by the particulate matter, it is sufficient for generating an object detection associated with the barrier 504 despite the vast amount of noise introduced by the particulate matter.

Example Process to Denoise Lidar Data

Figure 6:
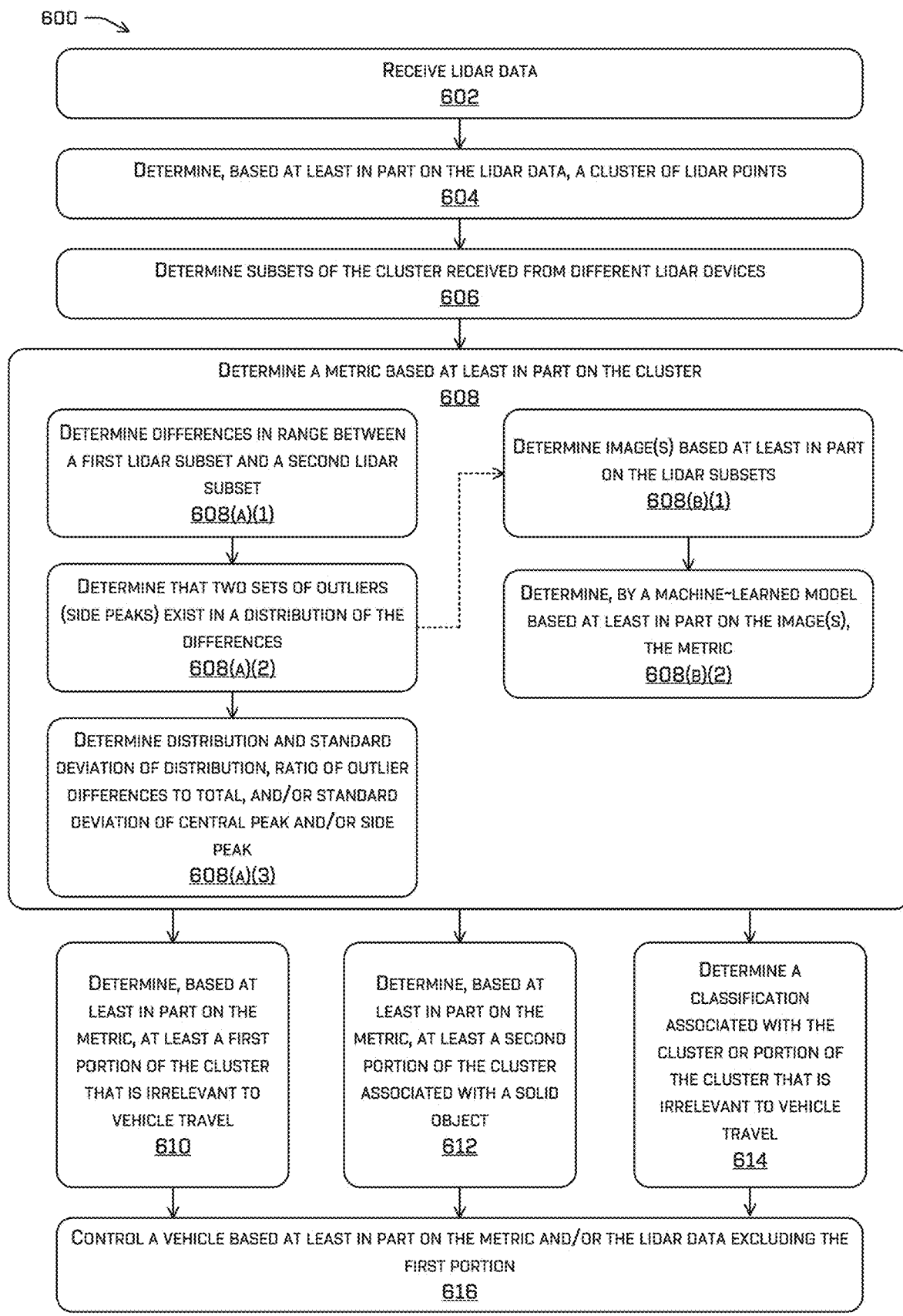
FIG. 6 illustrates a flow diagram of an example process for denoising lidar data that may be noisy due to particulate matter and/or debris to increase the safety and efficiency of vehicle control.

FIG. 6 illustrates a flow diagram of an example process 600 for denoising lidar data that may be noisy due to particulate matter and/or debris to increase the safety and efficiency of vehicle control. The operations in the process 600 may be used in combination, separately, and/or performed by the same device or different devices. For example, the operations can be implemented by a computing device of an autonomous vehicle 202 and/or a remote computing device (e.g., of a distributed computing service, of a teleoperations system). Hardware and/or software components of a vehicle computing system may be configured to accomplish at least part of the example process 600.

At operation 602, example process 600 may comprise receiving lidar data from two or more lidar devices, according to any of the techniques discussed herein. The lidar data may comprise at least two sets of lidar data, one from each lidar device, each of which may include lidar points associated with individual returns. A lidar point may indicate a range (i.e., distance) from the respective lidar device to a surface that reflected light, causing the return; an intensity of the return; an identification of the lidar device that generated the lidar devices; and/or a position of the return in space, which may be indicated by Euclidean, spherical, or any other suitable coordinates for identifying where the return came from. In some examples, operation 602 may additionally or alternatively comprise a parallax-aware or voxel pixel mapping to convert the two sets of lidar data into a common space that accounts for the different positions of the lidar, such that a portion of the common space is associated with a same portion of the environment. In other words, the parallax-aware pixel or voxel mapping may include determining a pixel or voxel that is associated with a same portion of the environment and mapping a first return of the first lidar data and a second return of the second lidar data to that pixel or voxel based at least in part on a parallax aware mapping.

At operation 604, example process 600 may comprise determining, based at least in part on the lidar data, a cluster of lidar points, according to any of the techniques discussed herein. In some examples, determining the cluster may comprise using k-means, k-medians, agglomerative clustering, mean shift clustering, density-based spatial clustering (DBSCAN), or the like to determine a cluster of lidar points based at least in part on their range data. Regardless of the technique used, the clustering algorithm may determine the cluster based at least in part on the distances between lidar points. In some examples, where k-means is used, k may be defined using the elbow method or any other suitable method for choosing k. In some examples, operation 604 may additionally or alternatively comprise determining a cluster that comprises at least n number of lidar points within the cluster, where n is a positive integer. Additionally or alternatively, operation 604 may determine whether a cluster comprises lidar points indicating a range associated with a variance or standard deviation that meets or exceeds a threshold variance or standard deviation to identify those clusters that may be associated with a non-uniform surface, although in another example all clusters may be analyzed using the following operations.

At operation 606, example process 600 may comprise determining subsets of the cluster received from different lidar devices, according to any of the techniques discussed herein. For example, operation 606 may comprise using a lidar device identifier associated with a lidar return to distinguish which lidar device generated that point within the cluster. In some examples, operation 606 may comprise excluding lidar points in the cluster received from one lidar device if the number of lidar points received from that lidar device do not meet or exceed a threshold number of lidar points. Operation 606 may accordingly result in distinguishing the different lidar devices that determined respective subsets of lidar data in a cluster.

At operation 608, example process 600 may comprise determining a metric based at least in part on the cluster, according to any of the techniques discussed herein. Operation 608 may comprise a metric-based process 608(*a*) and/or a machine-learned process 608(*b*).

At operation 608(*a*)(1), an example metric-based process 608(*a*) may comprise determining differences in range between a first lidar subset (received from a first lidar device) and second lidar subset (received from a second lidar device) of the cluster, according to any of the techniques discussed herein. This may include determining a first lidar point of the first lidar subset and a second lidar point of the lidar subset that should be associated with a same location in space if the object is solid and determining a difference between a first range indicated by the first lidar point and a second range indicated by the second lidar point. In other words, operation 608(*a*)(1) may comprise determining a difference in range indicated by two different lidar devices for what should be a same point in space. For example, two corresponding points in the two sets of lidar device would be associated with a same location in the environment for a solid surface and would accordingly indicate a same or similar range. Note that the difference between the two ranges may be adjusted to account for the parallax effect, which is caused by the lidar sensors' respective positions. In other words, the ranges will vary for returns that lie further toward one sensor than the other. This may be repeated for up to all the lidar points in the cluster. Different distributions/histograms of example range differences are depicted in FIGS. 7-10.

At operation 608(*a*)(2), an example metric-based process 608(*a*) may comprise determining that the differences determined at operation 608(*a*)(1) comprise two sets of outliers (i.e., side peaks in a distribution of the differences). In some examples, operation 608(*a*)(2) may comprise determining the existence of a set of outliers by determining that a threshold number of differences is greater than a (positive or negative) threshold difference. In some examples, two side peaks may exist where a requisite number of differences are greater in magnitude than both a positive and a negative threshold differences. In examples where the differences are indicated in absolute magnitude of difference (i.e., where there are no negative differences), operation 608(*a*)(2) may comprise determining whether there is a single set of outliers. In an example where both positive and negative differences are computed, the existence of a single side peak (e.g., negative differences that meet or exceed a negative threshold difference or positive differences that meet or exceed a positive threshold difference) may indicate that one of the lidar sensors is occluded. In some examples, this indication may be output to a planning component of the vehicle as part of controlling the vehicle and the remaining operations may be bypassed.

At operation 608(*a*)(3), an example metric-based process 608(*a*) may comprise determining the metric based at least in part on the differences determined at operation 608(*a*)(1). In some examples, determining the metric may comprise determining a standard deviation of the range differences, a ratio of range differences in side peak(s) of a distribution of the range differences/outlier range differences to a total number of range differences determined for the cluster, and/or a standard deviation of a differences in a central peak and/or side peak of a distribution of the range differences. For example, determining the metric may comprise determining a standard deviation and/or variance between all the range differences determined for the cluster and/or determining a ratio of this standard deviation to a nominal standard deviation associated with range differences associated with lidar returns received from solid objects, which may be experimentally determined. Additionally or alternatively, determining the metric may comprise determining outlier range differences and/or side peak(s) of a distribution of the range differences by determining range differences that meet or exceed a threshold difference (which may be an absolute number that may include a positive threshold difference and a negative threshold difference or differences may be indicated as an absolute value and there may be a single threshold difference). The metric may be determined by determining a ratio of the number range differences that meet or exceed the threshold difference to the total number of points in the cluster. Additionally or alternatively, determining the metric may comprise determining a standard deviation of a central peak of the distribution, which may include determining those range differences having a range difference that is less than the threshold range difference and determining a standard deviation for these range differences. Determining a standard deviation of a side peak may comprise determining the standard peak of those range differences having a range difference that meets or exceeds the threshold range difference.

In some examples, operation 606, operation 608(*a*)(1), and/or operation 608(*a*)(2) may be used as a filtering process to determine a subset of lidar data to be used for operation 608(*b*)(1) and/or operation 608(*b*)(2). For example, the clustering at operation 606 may be used to determine a subset of data for which image(s) are determined at operation 608(*b*)(1)—an image may be determined for a cluster, rather than all the lidar data. In an additional or alternate example, operation 608(*a*)(2) may be used to determine a subset of lidar data for which to determine an image at operation 608(*b*)(1). For example, the central peak and/or side peaks may be used to determine an image at operation 608(*b*)(1).

At operation 608(*b*)(1), an example machine-learned process 608(*b*) may comprise determining image(s) based at least in part on the lidar subsets. For example, a first image may be generated for the first lidar subset of the cluster and a second image may be generated for the second lidar subset of the cluster. Generating an image based at least in part on a lidar subset may comprise generating a multi-channel image, where each channel or portion of a channel may be dedicated to a different type of data indicated by a lidar device for the cluster. For example, a position of a pixel in such an image may be associated with a portion of the environment and different channels or portions of channels associated with that pixel may indicate a range determined by the respective lidar device to that portion of the environment, an intensity of the return received from that portion of the environment, an identification of the lidar sensor that generated the return, and/or whether that pixel is associated with the cluster. In an additional or alternate example, pixels that don't have a lidar return associated therewith or that are associated with a lidar return that isn't part of the cluster may include such an indication or their channel(s) may be filled with nonce data.

A convolutional network or other machine-learned model may be trained to use these images to determine a classification or a likelihood that a point of the first subset and/or the second subset is irrelevant to vehicle travel or a prediction that the point belongs to a bin indicating a range of likelihoods that the point is irrelevant to vehicle travel. For example, the machine-learned model may receive the images as input and may, based at least in part on the trained parameters of the machine-learned model, determine a likelihood associated with a pixel that indicates whether a lidar point associated therewith is associated with particulate matter or debris. In some examples, the techniques may include suppressing those points classified as being associated with a false return or having a likelihood thereof of which meets or exceeds a threshold likelihood. In some examples, the bin or likelihood may be used as the metric discussed herein in addition to or instead of the metric(s) determined by process 608(*a*). Operation 608(*a*) and 608(*b*) may both be used or just one of these processes may be used to determine metric(s).

In some examples, the metric may be additionally or alternatively used to determine an effective range of the lidar devices, which may be used as part of controlling an operation of a vehicle. The effective range may be a distance at which the lidar devices are estimated to determine a range and/or intensity at a threshold accuracy. For example, determining the effective range may be based at least in part on a standard deviation of the differences determined for a cluster or multiple such standard deviations for up to all the clusters, such as an average of such standard deviations. The effective range may additionally or alternatively be determined based at least in part on a density of the points within a cluster and/or the density of the side peaks in the distribution discussed herein (e.g., the greater the density, the lesser the effective range). In some examples, the effective range may be determined in response to classifying (at operation 614) the cluster as a global impediment, such as fog, rain, snow, or the like instead of a local impediment, such as a rooster tail, vehicle exhaust, steam (e.g., from a manhole cover or the like), etc. Additionally or alternatively, the metric may be used to distinguish debris from particulate matter (e.g., by using different thresholds for distinguishing debris from particulate matter, debris from another solid object, and/or particulate matter from another solid object).

At operation 610, example process 600 may comprise determining, based at least in part on the metric, a first portion of the cluster that is irrelevant to vehicle travel, according to any of the techniques discussed herein. For example, operation 610 may comprise determining that the metric satisfies a criterion for indicating that the portion of the cluster is associated with particulate matter or debris. Satisfying the criterion may include, for example, determining that a standard deviation of the difference in ranges meets or exceeds a first threshold standard deviation, determining that the ratio of the number of outlier/side peak range differences to total number of cluster points meets or exceeds a threshold ratio (i.e., thereby indicating that the number of differences in the side peaks is greater than the number of differences in the central peak), determining that the standard deviation of the range differences in the central peak meets or exceeds a second threshold standard deviation, determining that the standard deviation of the range differences in a side peak meets or exceeds a second threshold standard deviation, determining that a lidar point is associated with a likelihood determined by the machine-learned model that meets or exceeds a threshold likelihood, and/or determining that pixel associated with a lidar point was classified into a bin indicating that the lidar point is associated with particulate matter or debris. Any one or more of these criterion may be used. The first threshold standard deviation may be the same or different than the second threshold standard deviation.

For any lidar point associated with range differences that satisfy any one or more of these criteria, operation 610 may suppress from output to a subsequent perception component and/or a planning component of the vehicle or may include an indication that the lidar point is likely associated with particulate matter or debris and/or a may output the metric(s) with the lidar point. For example, lidar points associated with range differences of a side peak may be suppress or annotated.

In some examples, operation 610 may additionally or alternatively comprise suppressing from output or including an indication a lidar point that satisfies any of the criteria discussed above and that indicates an intensity that is less than a threshold intensity. In other words, the intensity data indicated by a lidar subset may be used to corroborate an indication that a lidar return is associated with particulate matter or debris if the intensity of that lidar return is less than a threshold intensity. If the lidar return indicates an intensity that meets or exceeds the threshold intensity, the lidar return may be suppressed/indicated as being associated with particulate matter or debris unless the lidar return satisfies a threshold number of the criteria discussed above. Such a threshold number of criteria may be greater than an initial threshold number of criteria to initially indicate that the lidar return may be associated with particulate matter or debris in some examples.

At operation 612, example process 600 may comprise determining, based at least in part on the metric, at least a second portion of the cluster associated with a solid object. In some examples, where operation 610 identifies the entire cluster as being associated with particulate matter or debris, operation 612 may be skipped. Additionally or alternatively, operation 612 may be executed anyway to verify that no lidar returns are associated with a solid object. Operation 612 may comprise determining any lidar points that are associated with differences that are less than the threshold difference for determining outlier differences or less than a second threshold difference (depicted in FIG. 8) that is less than the threshold difference for determining outlier differences, determining that the standard deviation of the range differences in the central peak is less than the second threshold standard deviation, determining that a lidar point is associated with a likelihood determined by the machine-learned model that is less than the threshold likelihood, and/or determining that a pixel associated with a lidar point was classified into a bin indicating that the lidar point is associated with a solid object relevant to vehicle travel. Additionally or alternatively, operation 612 may comprise retaining lidar returns associated with range differences that are less than a threshold. Additionally or alternatively, those lidar returns that are retained may further filtered to determine whether they indicate an intensity that meets or exceeds an intensity threshold. Those points that indicate an intensity less than the intensity threshold may be suppressed or may have the intensity value associated therewith when the lidar point is transmitted to a downstream component of the vehicle 202.

Once the techniques determine that a lidar point is a false return according to either approach, the techniques may include suppressing the false return from being identified as a detection. This suppression may be accomplished by preventing the lidar system from positively identifying the detection as a true positive detection. Preventing the lidar system from identifying the detection as a true positive detection may include discarding an output signal, associating a false return identifier with the lidar point (for use by downstream components), and/or associating the metric, classification, and/or likelihood with that lidar point.

At operation 614, example process 600 may comprise determining a classification associated with the cluster or the portion of the cluster that is identified as being irrelevant to vehicle travel (at operation 610). For example, the classification may indicate a type of particulate matter or debris associated with the cluster or the portion of the cluster indicated as being irrelevant to vehicle travel. Such a classification may distinguish between "rain/snow," "fog," "rooster tail," "vehicle smog/exhaust," "steam" (e.g., from a manhole cover), and/or "debris," etc. Classifying the cluster or portion of the cluster as a rooster tail or vehicle smog may comprise determining that the cluster or portion of the cluster is located within a threshold distance of a vehicle and that the volume or area of the cluster is less than a threshold volume or area. Classifying the cluster or portion of the cluster as rain or fog may comprise determining the range differences discussed herein and determining a rate of change of the differences or rate of change of the standard deviation of the side peak, central peak, and/or total distribution. The cluster or portion of the cluster may be classified as rain if either of these rates of change meets or exceeds a threshold and if the cluster maintains a constant distance from the vehicle 202 (e.g., exhibits a same range from the vehicle within a standard deviation threshold), whereas the cluster or portion of the cluster may be classified as fog if the cluster maintains a constant distance from the vehicle 202 and either or both rate of change is less than the threshold rate of change. Additionally or alternatively, classifying the cluster or a portion thereof as rain/snow or fog may be based at least in part on determining that a median intensity of the points in the cluster/portion are less than a threshold intensity and/or determining that the points in the cluster surround the vehicle in all directions (e.g., the azimuth extent is greater than an azimuth extent threshold). Additionally or alternatively, classifying the cluster as being associated with rain/snow, fog, rooster tail, vehicle smog, or debris may comprise determining that the difference distribution is trimodal, the ratio of differences in the side peaks of the distribution to central peak differences meets or exceeds a threshold ratio, a width and/or standard deviation of the central peak meets or exceeds a range precision of the lidar device(s), and/or the width and/or standard deviation of the side peaks meets or exceeds the range precision of the lidar device(s). The method may additionally or alternatively determine a severity of adverse weather classification based at least in part on a number of points within the cluster or the portion of the cluster (e.g., the greater the number of points, the higher the severity of the adverse weather). In some examples, the severity may be indicated as a logit, which may be normalized to a range between 0 and 1, inclusive.

Any of the classifications may be determined based at least in part on training an ML model to detect the classification type based at least in part on using the lidar (range and/or intensity) data in the cluster or portion of the cluster identified at 610 as input data to the ML model and using ground truth labelling as part of the training for such an ML model. In some examples, the ML model may additionally or alternatively use any of the data discussed above for classifying the particulate matter or debris or metrics determined at operation 608(*a*)(3).

At operation 616, example process 600 may comprise controlling the vehicle based at least in part on the metric and/or the second portion of the cluster, according to any of the techniques discussed herein. In some examples, operation 616 may comprise controlling an operation of the vehicle based at least in part on the remaining lidar data after any suppressions have been made or based at least in part on the first portion with annotations associated therewith, as discussed above, which may include the metric(s) and/or an indication that the first portion may be associated with particulate matter or debris. In some examples, operation 616 may comprise controlling an operation of the vehicle based at least in part on the classification determined at operation 614.

Example Range Difference Distributions

Figure 7:
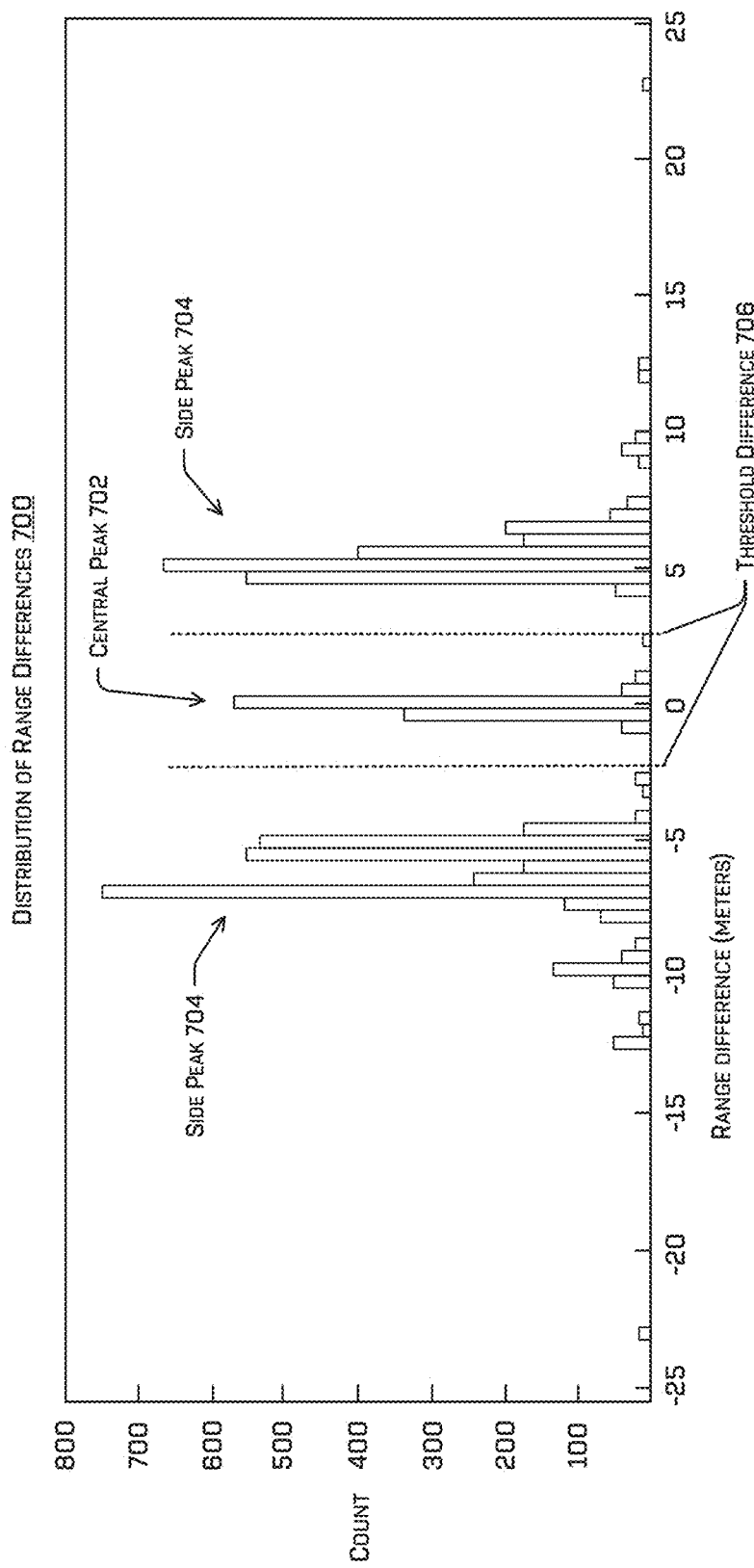
FIG. 7 illustrates a distribution of range differences between two sets of lidar data associated with a same cluster when particulate matter or debris is present.
Figure 9:
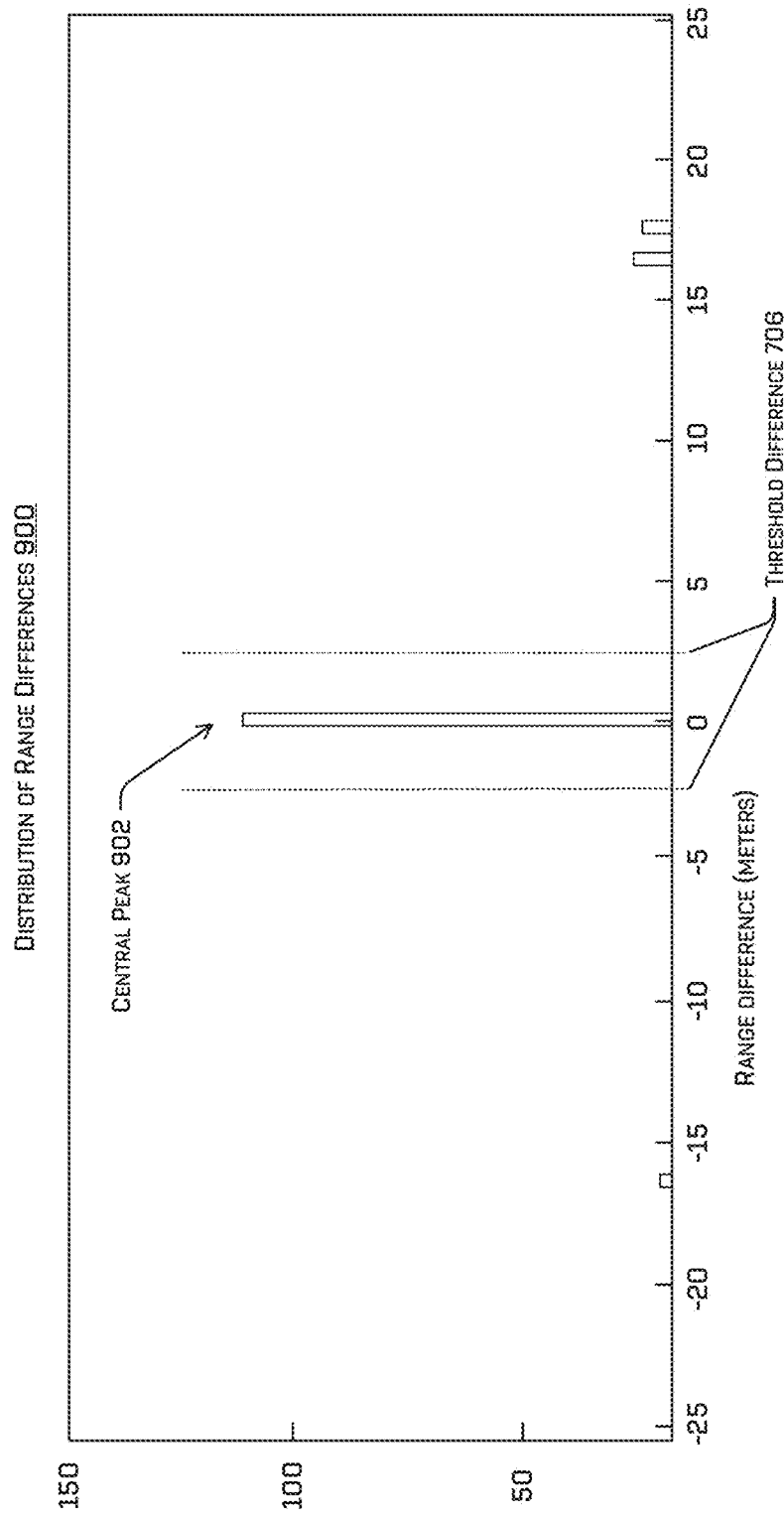
FIG. 9 illustrates a distribution of range differences between two sets of lidar data associated with a same cluster when particulate matter or debris is absent.

FIGS. 7 and 8 illustrate an example distribution of range differences 700 between two subsets of lidar data of a same cluster when particulate matter or debris is present. FIG. 8 illustrates a closeup of the central peak of the distribution of range differences 700 illustrated in FIG. 7. FIGS. 9 and 10 illustrate a distribution of range differences 900 of two subsets of lidar data of a same cluster in the absence of particulate matter or debris. FIG. 10 illustrates a closeup of the distribution of range differences 900 illustrated in FIG. 9. The depictions in FIGS. 7-10 all include the range differences determined between a first lidar subset and a second lidar subset. The depictions all include the range difference (or range difference bin, i.e., range) in meters on the x-axis and a count of the number of range differences for each range difference on the y-axis. Note that the scale of the x-axis is the same for FIGS. 7 and 10, but that the scale of the x-axis is much smaller for FIGS. 8 and 10 compared to FIGS. 7 and 10. Also, it is understood that although the difference is indicated in reference to one of the lidar data sets, meaning that one lidar data set is chosen as the reference and the difference is calculated as a positive or negative range difference of the other lidar set from that chosen lidar set, the difference may be alternately indicated as an absolute difference between the two lidar data ranges. In the latter example, the ranges would be indicated as positive values or zero.

The distribution of range differences 700 determined when particulate matter or debris is present, as depicted in FIG. 7, is trimodal, including a central peak and two side peaks (if the differences are determined using an absolute value, the distribution may be bimodal). In some examples, lidar points associated with difference in the central peak 702 may be associated with a solid object whereas the lidar points associated with range differences in the two side peaks 704 may be associated with particulate matter or debris. Whereas the distribution of range differences 900 determined when particulate matter or debris is absent is unimodal and includes far less outlier range differences.

FIGS. 7 and 9 also illustrate a threshold difference 706 for determining the side peaks and/or outlier range differences for use in discriminating the central peak from the side peaks. Lidar points associated with differences greater than the threshold difference 706 may be indicated as being associated with particulate matter or debris, as discussed in fuller detail regarding operation 610, and lidar points associated with differences less than the threshold difference 706 (or threshold difference 800, which may be the same or less than the threshold difference 706) may be associated with a solid surface. Note that the depicted threshold difference 706 comprises both a negative threshold difference and a positive threshold difference. Accordingly, the side peak on the left has differences that meet or exceed the negative threshold difference (i.e., they have a greater negative magnitude than the negative threshold difference) and the side peak on the right has differences that meet or exceed the positive threshold difference (i.e., they have a greater positive magnitude than the positive threshold difference). This discrimination may be used to determine a ratio of the number of outlier range differences (any absolute range differences greater than the absolute threshold range difference) to a total number of points in the cluster and/or a standard deviation of the central peak (e.g., the differences less than the absolute threshold range difference). Note that the standard deviation for all of the range differences of the range differences indicated in distribution of range differences 700 would be much higher than the standard deviation of all the differences of the distribution of range differences 900 when particulate matter or debris is absent. Moreover, the ratio of the number of outlier range differences in the distribution of range differences 700 would also be far higher than the same ratio for the distribution of range differences 900.

FIG. 8 illustrates a closeup of the central peak 702 of the distribution of range differences 700 illustrated in FIG. 7. Notably, the standard deviation of the central peak 702 would be far larger than the standard deviation of the central peak 902 of distribution of range differences 900. For example, the standard deviation of the illustrated central peak 702 is 0.5 meters, whereas the standard deviation of the illustrated central peak 902 is 5 centimeters an order of magnitude less than the standard deviation of the central peak 702. FIG. 8 also depicts a second threshold difference 800 that may be the same or less than the threshold difference 706. The threshold difference 800 depicted in FIG. 8 is less than the threshold difference 706. In some examples, the second threshold difference 800 may be used to determine lidar returns that may be associated with a solid object. In some cases, particulate matter or debris may partially obscure an object that should be used as part of vehicle operation planning, such as a barrier that is behind rain, fog, debris, or the like. Lidar points associated with differences that are less than the second threshold difference 800 may be indicated as being associated with a solid surface and/or may not be suppressed (e.g., they may be included in the portion of the cluster that is determined to be associated with a solid object at operation 612). Determining to indicate a lidar return is associated with a solid object may additionally or alternatively be based on determining that the lidar return indicates an intensity that meets or exceeds a threshold intensity.

Example Clauses

A: A system comprising: one or more processors; and one or more one or more non-transitory computer-readable media storing processor-executable instructions that, when executed by the one or more processors, cause the system to perform operations comprising: receiving lidar data; determining, based at least in part on distances between points of the lidar data, a cluster of lidar points; determining a first subset of the cluster that was received from a first lidar device; determining a second subset of the cluster that was received from a second lidar device; determining differences in range between points of the first subset and the second subset, wherein a first difference of the differences indicates a disparity between a first range indicated by a first lidar point of the first subset and a second range indicated by a second lidar point of the second subset; determining that the differences comprise a first subset of differences that are more negative than a first negative threshold difference and a second subset of differences that are more positive than a first positive threshold difference; determining, based at least in part on the first subset of differences and the second subset of differences, that a first portion of lidar data in the cluster is associated with particulate matter or debris, wherein the first portion of lidar data is associated with lidar points from which the first subset of differences and second subset of differences were determined; and controlling a vehicle based at least in part on suppressing the first portion the lidar data.

B: The system of paragraph A, wherein: controlling the vehicle is based at least in part on a second portion of lidar data in the cluster, determining the second portion of lidar data includes determining the second portion of lidar data is associated with an object relevant to vehicle travel, determining the second portion of lidar comprises determining the second portion of lidar data is associated with at least one of second negative differences that are less than a second negative threshold difference or second positive differences that are less than a second positive threshold, the second negative threshold may be the same or less than the first negative threshold, and the second positive threshold may be the same or less than the first positive threshold.

C: The system of either paragraph A or B, wherein determining that the first portion of lidar data is associated with particulate matter or debris is further based at least in part on: determining a distribution of the differences in range; determining a standard deviation of the distribution; determining a ratio of the standard deviation to a nominal standard deviation associated with solid objects; and determining that the ratio meets or exceeds a threshold ratio.

D: The system of any one of paragraphs A-C, wherein determining that the first portion of lidar data is associated with particulate matter or debris is further based at least in part on: determining a distribution of the differences in range; and determining the distribution is tri-modal.

E: The system of any one of paragraphs A-D, wherein determining that the first portion of lidar data is associated with particulate matter or debris is further based at least in part on: determining a distribution of the differences in range; determining a standard deviation or variance of at least one of the first subset of negative differences and the second subset of positive differences; and determining the portion of the cluster that is associated with the particulate matter or debris comprises determining that the standard deviation or the variance meets or exceeds a threshold standard deviation or a threshold variance.

F: One or more non-transitory computer-readable media storing processor-executable instructions that, when executed by one or more processors, cause one or more processors to perform operations comprising: receiving lidar data; determining, based at least in part on the lidar data, a cluster of lidar points including a first subset of lidar data received from a first lidar device and a second subset of lidar data received from a second lidar device; determining differences in range between points of the first subset and the second subset, wherein a first difference of the differences indicates a disparity between a first range indicated by a first lidar point of the first subset and a second range indicated by a second lidar point of the second subset; determining that the differences comprise a first subset of differences that meet or exceed a first negative threshold difference and a second subset of positive differences that meet or exceed a first positive threshold difference; determining, based at least in part on the first subset of differences and the second subset of differences, that a first portion of lidar data in the cluster is associated with particulate matter or debris, wherein the first portion of lidar data is associated with lidar points from which the first subset of differences and second subset of differences were determined; and controlling a vehicle based at least in part on suppressing the first portion the lidar data or indicating that the first portion of the lidar data is associated with particulate matter or debris.

G: The one or more non-transitory computer-readable media of paragraph F, wherein: controlling the vehicle is based at least in part on a second portion of lidar data in the cluster, determining the second portion of lidar data includes determining the second portion of lidar data is associated with an object relevant to vehicle travel, determining the second portion of lidar comprises determining the second portion of lidar data is associated with at least one of second negative differences that are less than a second negative threshold difference or second positive differences that are less than a second positive threshold, the second negative threshold may be the same or less than the first negative threshold, and the second positive threshold may be the same or less than the first positive threshold.

H: The one or more non-transitory computer-readable media of either paragraph F or G, wherein determining that the first portion of lidar data is associated with particulate matter or debris is further based at least in part on: determining a distribution of the differences in range; determining a standard deviation of the distribution; determining a ratio of the standard deviation to a nominal standard deviation associated with solid objects; and determining that the ratio meets or exceeds a threshold ratio.

I: The one or more non-transitory computer-readable media of any one of paragraphs F-H, wherein determining that the first portion of lidar data is associated with particulate matter or debris is further based at least in part on: determining a distribution of the differences in range; and determining the distribution is tri-modal.

J: The one or more non-transitory computer-readable media of any one of paragraphs F-I, wherein determining that the first portion of lidar data is associated with particulate matter or debris is further based at least in part on: determining a distribution of the differences in range; determining a standard deviation or variance of at least one of the first subset of negative differences and the second subset of positive differences; and determining the portion of the cluster that is associated with the particulate matter or debris comprises determining that the standard deviation or the variance meets or exceeds a threshold standard deviation or a threshold variance.

K: The one or more non-transitory computer-readable media of any one of paragraphs F-J, wherein the operations further comprise: determining, based at least in part on the first subset of the cluster, a first image depicting range values of the first subset; determining, based at least in part on the second subset of the cluster, a second image depicting range values of the second subset; and determining, by a machine-learned model and based at least in part on the first image and the second image, at least one of a classification or a likelihood that a point of the first subset or the second subset is associated with the particulate matter or debris or a prediction that the point belongs to a bin indicating a range of likelihoods that the point is associated with the particulate matter or debris.

L: The one or more non-transitory computer-readable media of any one of paragraphs F-K, wherein the operations further comprise: determining, based at least in part on a density of at least one of the first subset of differences and the second subset of differences, a distance at which accuracy of at least one of the first lidar device or the second lidar device is estimated to be below a threshold accuracy; and controlling the vehicle based at least in part on the distance.

M: A method comprising: receiving lidar data; determining, based at least in part on the lidar data, a cluster of lidar points including a first subset of lidar data received from a first lidar device and a second subset of lidar data received from a second lidar device; determining differences in range between points of the first subset and the second subset, wherein a first difference of the differences indicates a disparity between a first range indicated by a first lidar point of the first subset and a second range indicated by a second lidar point of the second subset; determining that the differences comprise a first subset of differences that meet or exceed a first negative threshold difference and a second subset of positive differences that meet or exceed a first positive threshold difference; determining, based at least in part on the first subset of differences and the second subset of differences, that a first portion of lidar data in the cluster is associated with particulate matter or debris, wherein the first portion of lidar data is associated with lidar points from which the first subset of differences and second subset of differences were determined; and controlling a vehicle based at least in part on suppressing the first portion the lidar data or indicating that the first portion of the lidar data is associated with particulate matter or debris.

N: The method of paragraph M, wherein: controlling the vehicle is based at least in part on a second portion of lidar data in the cluster, determining the second portion of lidar data includes determining the second portion of lidar data is associated with an object relevant to vehicle travel, determining the second portion of lidar comprises determining the second portion of lidar data is associated with at least one of second negative differences that are less than a second negative threshold difference or second positive differences that are less than a second positive threshold, the second negative threshold may be the same or less than the first negative threshold, and the second positive threshold may be the same or less than the first positive threshold.

O: The method of either paragraph M or N, wherein determining that the first portion of lidar data is associated with particulate matter or debris is further based at least in part on: determining a distribution of the differences in range; determining a standard deviation of the distribution; determining a ratio of the standard deviation to a nominal standard deviation associated with solid objects; and determining that the ratio meets or exceeds a threshold ratio.

P: The method of any one of paragraphs M-O, wherein determining that the first portion of lidar data is associated with particulate matter or debris is further based at least in part on: determining a distribution of the differences in range; and determining the distribution is tri-modal.

Q: The method of any one of paragraphs M-P, wherein determining that the first portion of lidar data is associated with particulate matter or debris is further based at least in part on: determining a distribution of the differences in range; determining a standard deviation or variance of at least one of the first subset of negative differences and the second subset of positive differences; and determining the portion of the cluster that is associated with the particulate matter or debris comprises determining that the standard deviation or the variance meets or exceeds a threshold standard deviation or a threshold variance.

R: The method of any one of paragraphs M-Q, further comprising: determining, based at least in part on the first subset of the cluster, a first image depicting range values of the first subset; determining, based at least in part on the second subset of the cluster, a second image depicting range values of the second subset; and determining, by a machine-learned model and based at least in part on the first image and the second image, at least one of a classification or a likelihood that a point of the first subset or the second subset is associated with the particulate matter or debris or a prediction that the point belongs to a bin indicating a range of likelihoods that the point is associated with the particulate matter or debris.

S: The method of any one of paragraphs M-R, further comprising: determining, based at least in part on a density of at least one of the first subset of differences and the second subset of differences, a distance at which accuracy of at least one of the first lidar device or the second lidar device is estimated to be below a threshold accuracy; and controlling the vehicle based at least in part on the distance.

T: The method of any one of paragraphs M-S, further comprising determining, by a machine-learned model, at least one of an adverse weather classification or a severity of adverse weather associated with the first portion.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more one or more non-transitory computer-readable media storing processor-executable instructions that, when executed by the one or more processors, cause the system to perform operations comprising:
   receiving lidar data;
   determining, based at least in part on distances between points of the lidar data, a cluster of lidar points;
   determining a first subset of the cluster that was received from a first lidar device;
   determining a second subset of the cluster that was received from a second lidar device;
   determining differences in range between points of the first subset and the second subset, wherein a first difference of the differences indicates a disparity between a first range indicated by a first lidar point of the first subset and a second range indicated by a second lidar point of the second subset;
   determining that the differences comprise a first subset of differences that are more negative than a first negative threshold difference and a second subset of differences that are more positive than a first positive threshold difference;
   determining, based at least in part on the first subset of differences and the second subset of differences, that a first portion of lidar data in the cluster is associated with particulate matter or debris, wherein the first portion of lidar data is associated with lidar points from which the first subset of differences and the second subset of differences were determined; and
   controlling a vehicle based at least in part on suppressing the first portion of lidar data.

2. The system of claim 1, wherein:
   controlling the vehicle is based at least in part on a second portion of lidar data in the cluster,
   determining the second portion of lidar data includes determining the second portion of lidar data is associated with an object relevant to vehicle travel,
   determining the second portion of lidar comprises determining the second portion of lidar data is associated with at least one of second negative differences that are less than a second negative threshold difference or second positive differences that are less than a second positive threshold difference,
   the second negative threshold difference may be the same or less than the first negative threshold difference, and
   the second positive threshold difference may be the same or less than the first positive threshold difference.

3. The system of claim 1, wherein determining that the first portion of lidar data is associated with particulate matter or debris is further based at least in part on:
   determining a distribution of the differences in range;
   determining a standard deviation of the distribution;
   determining a ratio of the standard deviation to a nominal standard deviation associated with solid objects; and
   determining that the ratio meets or exceeds a threshold ratio.

4. The system of claim 1, wherein determining that the first portion of lidar data is associated with particulate matter or debris is further based at least in part on:
   determining a distribution of the differences in range; and
   determining the distribution is tri-modal.

5. The system of claim 1, wherein determining that the first portion of lidar data is associated with particulate matter or debris is further based at least in part on:
   determining a distribution of the differences in range;
   determining a standard deviation or variance of at least one of the first subset of differences and the second subset of differences; and
   determining the portion of the cluster that is associated with the particulate matter or debris comprises determining that the standard deviation or the variance meets or exceeds a threshold standard deviation or a threshold variance.

6. One or more non-transitory computer-readable media storing processor-executable instructions that, when executed by one or more processors, cause the one or more processors to perform operations comprising:
   receiving lidar data;
   determining, based at least in part on the lidar data, a cluster of lidar points including a first subset of lidar data received from a first lidar device and a second subset of lidar data received from a second lidar device;
   determining differences in range between points of the first subset and the second subset, wherein a first difference of the differences indicates a disparity between a first range indicated by a first lidar point of the first subset and a second range indicated by a second lidar point of the second subset;
   determining that the differences comprise a first subset of differences that meet or exceed a first negative threshold difference and a second subset of differences that meet or exceed a first positive threshold difference;
   determining, based at least in part on the first subset of differences and the second subset of differences, that a first portion of lidar data in the cluster is associated with particulate matter or debris, wherein the first portion of lidar data is associated with lidar points from which the first subset of differences and second subset of differences were determined; and
   controlling a vehicle based at least in part on suppressing the first portion of lidar data or indicating that the first portion of lidar data is associated with particulate matter or debris.

7. The one or more non-transitory computer-readable media of claim 6, wherein:
   controlling the vehicle is based at least in part on a second portion of lidar data in the cluster,
   determining the second portion of lidar data includes determining the second portion of lidar data is associated with an object relevant to vehicle travel,
   determining the second portion of lidar comprises determining the second portion of lidar data is associated with at least one of second negative differences that are less than a second negative threshold difference or second positive differences that are less than a second positive threshold difference,
   the second negative threshold difference may be the same or less than the first negative threshold difference, and
   the second positive threshold difference may be the same or less than the first positive threshold difference.

8. The one or more non-transitory computer-readable media of claim 6, wherein determining that the first portion of lidar data is associated with particulate matter or debris is further based at least in part on:
  determining a distribution of the differences in range;
  determining a standard deviation of the distribution;
  determining a ratio of the standard deviation to a nominal standard deviation associated with solid objects; and
  determining that the ratio meets or exceeds a threshold ratio.

9. The one or more non-transitory computer-readable media of claim 6, wherein determining that the first portion of lidar data is associated with particulate matter or debris is further based at least in part on:
  determining a distribution of the differences in range; and
  determining the distribution is tri-modal.

10. The one or more non-transitory computer-readable media of claim 6, wherein determining that the first portion of lidar data is associated with particulate matter or debris is further based at least in part on:
  determining a distribution of the differences in range;
    determining a standard deviation or variance of at least one of the first subset of differences and the second subset of differences; and
    determining the portion of the cluster that is associated with the particulate matter or debris comprises determining that the standard deviation or the variance meets or exceeds a threshold standard deviation or a threshold variance.

11. The one or more non-transitory computer-readable media of claim 6, wherein the operations further comprise:
  determining, based at least in part on the first subset of the cluster, a first image depicting range values of the first subset;
  determining, based at least in part on the second subset of the cluster, a second image depicting range values of the second subset; and
  determining, by a machine-learned model and based at least in part on the first image and the second image, at least one of a classification or a likelihood that a point of the first subset or the second subset is associated with the particulate matter or debris or a prediction that the point belongs to a bin indicating a range of likelihoods that the point is associated with the particulate matter or debris.

12. The one or more non-transitory computer-readable media of claim 6, wherein the operations further comprise:
  determining, based at least in part on a density of at least one of the first subset of differences and the second subset of differences, a distance at which accuracy of at least one of the first lidar device or the second lidar device is estimated to be below a threshold accuracy; and
  controlling the vehicle based at least in part on the distance.

13. A method comprising:
  receiving lidar data;
  determining, based at least in part on the lidar data, a cluster of lidar points including a first subset of lidar data received from a first lidar device and a second subset of lidar data received from a second lidar device;
  determining differences in range between points of the first subset and the second subset, wherein a first difference of the differences indicates a disparity between a first range indicated by a first lidar point of the first subset and a second range indicated by a second lidar point of the second subset;
  determining that the differences comprise a first subset of differences that meet or exceed a first negative threshold difference and a second subset of differences that meet or exceed a first positive threshold difference;
  determining, based at least in part on the first subset of differences and the second subset of differences, that a first portion of lidar data in the cluster is associated with particulate matter or debris, wherein the first portion of lidar data is associated with lidar points from which the first subset of differences and second subset of differences were determined; and
  controlling a vehicle based at least in part on suppressing the first portion of lidar data or indicating that the first portion of lidar data is associated with particulate matter or debris.

14. The method of claim 13, wherein:
  controlling the vehicle is based at least in part on a second portion of lidar data in the cluster,
  determining the second portion of lidar data includes determining the second portion of lidar data is associated with an object relevant to vehicle travel,
  determining the second portion of lidar comprises determining the second portion of lidar data is associated with at least one of second negative differences that are less than a second negative threshold difference or second positive differences that are less than a second positive threshold difference,
  the second negative threshold difference may be the same or less than the first negative threshold difference, and
  the second positive threshold difference may be the same or less than the first positive threshold difference.

15. The method of claim 13, wherein determining that the first portion of lidar data is associated with particulate matter or debris is further based at least in part on:
  determining a distribution of the differences in range;
  determining a standard deviation of the distribution;
  determining a ratio of the standard deviation to a nominal standard deviation associated with solid objects; and
  determining that the ratio meets or exceeds a threshold ratio.

16. The method of claim 13, wherein determining that the first portion of lidar data is associated with particulate matter or debris is further based at least in part on:
  determining a distribution of the differences in range; and
  determining the distribution is tri-modal.

17. The method of claim 13, wherein determining that the first portion of lidar data is associated with particulate matter or debris is further based at least in part on:
  determining a distribution of the differences in range;
    determining a standard deviation or variance of at least one of the first subset of differences and the second subset of differences; and
  determining the portion of the cluster that is associated with the particulate matter or debris comprises determining that the standard deviation or the variance meets or exceeds a threshold standard deviation or a threshold variance.

18. The method of claim 13, further comprising:
  determining, based at least in part on the first subset of the cluster, a first image depicting range values of the first subset;
  determining, based at least in part on the second subset of the cluster, a second image depicting range values of the second subset; and
  determining, by a machine-learned model and based at least in part on the first image and the second image, at least one of a classification or a likelihood that a point of the first subset or the second subset is associated with the particulate matter or debris or a prediction that the point belongs to a bin indicating a range of likelihoods that the point is associated with the particulate matter or debris.

19. The method of claim 13, further comprising:

determining, based at least in part on a density of at least one of the first subset of differences and the second subset of differences, a distance at which accuracy of at least one of the first lidar device or the second lidar device is estimated to be below a threshold accuracy; and controlling the vehicle based at least in part on the distance.

20. The method of claim 13, further comprising determining, by a machine-learned model, at least one of an adverse weather classification or a severity of adverse weather associated with the first portion.

* * * * *